US011910509B2

(12) United States Patent
Gallivanoni et al.

(10) Patent No.: US 11,910,509 B2
(45) Date of Patent: Feb. 20, 2024

(54) METHOD FOR IMPROVING ACCURACY IN LOAD CURVES ACQUISITION ON AN INDUCTION COOKTOP

(71) Applicant: WHIRLPOOL CORPORATION, Benton Harbor, MI (US)

(72) Inventors: Andrea Gallivanoni, Casorate Sempione (IT); Cristiano Vito Pastore, Comerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 395 days.

(21) Appl. No.: 17/189,724

(22) Filed: Mar. 2, 2021

(65) Prior Publication Data

US 2022/0287158 A1 Sep. 8, 2022

(51) Int. Cl.
*H05B 6/06* (2006.01)
*F24C 7/08* (2006.01)

(52) U.S. Cl.
CPC ............. *H05B 6/065* (2013.01); *F24C 7/088* (2013.01)

(58) Field of Classification Search
CPC . F24C 7/088; H05B 2213/03; H05B 2213/05; H05B 6/062; H05B 6/065
USPC ........... 219/460.1–462.1, 620–627, 660–677
See application file for complete search history.

(56) References Cited

U.S. PATENT DOCUMENTS 8,558,148 B2 10/2013 Artigas Maestre et al.
8,686,321 B2 4/2014 Parachini et al.
9,006,621 B2 4/2015 Artal Lahoz et al.
9,084,295 B2 7/2015 Sadakata et al.
9,113,502 B2 8/2015 Anton Falcon et al.
9,173,252 B2 10/2015 Lee et al.
9,693,396 B2 6/2017 Jeanneteau et al.
2015/0245417 A1* 8/2015 Fattorini ................ H05B 6/065 219/662
2018/0368214 A1 12/2018 Acero Acero et al.
2019/0029079 A1 1/2019 Calsella et al.
2019/0200421 A1 1/2019 Lei et al.
2019/0200420 A1* 6/2019 Jeanneteau ............ H05B 6/065
2021/0307124 A1* 9/2021 Suga ...................... H05B 6/065

FOREIGN PATENT DOCUMENTS

EP 1951003 A1 7/2008
EP 2389045 A1 11/2011
EP 2469972 A1 6/2012
EP 2731402 A1 5/2014
EP 3291642 A1 3/2018
EP 3307018 B1 3/2019
WO 9737515 10/1997
(Continued)

*Primary Examiner* — Sang Y Paik
(74) *Attorney, Agent, or Firm* — Price Heneveld LLP

(57) ABSTRACT

A method is provided for controlling average power delivered to coils of a flexible induction cooktop having a plurality of coils that are arranged adjacent to one another in a non-overlapping manner to form an array. The method includes: a) identifying a group of the plurality of coils that are underlying one or more cookware items; b) providing power to at least one coil of the group of coils underlying one or more cookware items; and c) at the same time, not providing power to coils of the group of coils underlying the cookware items that are adjacent to the at least one coil to which power is provided to prevent interaction between adjacent coils of the group of coils.

22 Claims, 21 Drawing Sheets

(56) References Cited

FOREIGN PATENT DOCUMENTS

| | | | |
|---|---|---|---|
| WO | 2008061908 | A1 | 5/2008 |
| WO | 2014064932 | A1 | 5/2014 |
| WO | 2016010492 | A1 | 1/2016 |
| WO | 2017093168 | A1 | 6/2017 |

* cited by examiner

METHOD FOR IMPROVING ACCURACY IN LOAD CURVES ACQUISITION ON AN INDUCTION COOKTOP

BACKGROUND OF THE DISCLOSURE

The present disclosure generally relates to induction cooktops, and more specifically, to a method of heating items placed on an induction cooktop.

SUMMARY OF THE DISCLOSURE

According to one aspect of the present disclosure, a method is provided for controlling average power delivered to coils of a flexible induction cooktop having a plurality of coils that are arranged adjacent to one another in a non-overlapping manner to form an array. The method comprises: a) identifying a group of the plurality of coils that are underlying one or more cookware items; b) providing power to at least one coil of the group of coils underlying one or more cookware items; and c) at the same time, not providing power to coils of the group of coils underlying the cookware items that are adjacent to the at least one coil to which power is provided to prevent interaction between adjacent coils of the group of coils.

According to another aspect of the present disclosure, a method is provided for controlling average power delivered to coils of a flexible induction cooktop having a plurality of coils that are arranged adjacent to one another in a non-overlapping manner to form an array. The method comprises: a) identifying a group of the plurality of coils that are underlying one or more cookware items; b) providing power to at least one coil of the group of coils underlying one or more cookware items; and c) restricting the coils that can be activated at the same time to be coils whose distance between each pair of the group of coils is larger than a predetermined threshold.

According to yet another aspect of the present disclosure, a method is provided for controlling average power delivered to coils of a flexible induction cooktop having a plurality of coils that are arranged adjacent to one another in a non-overlapping manner to form an array. The method comprises: a) identifying a group of the plurality of coils that are underlying one or more cookware items, wherein the coils have a rectangular shape with longer sides and shorter sides, and coils may be adjacent one another along either the longer side or the shorter side; b) providing power to at least one coil of the group of coils underlying one or more cookware item; and c) not providing power to coils that are adjacent to each other either on a longer side, or on a shorter side.

These and other features, advantages, and objects of the present disclosure will be further understood and appreciated by those skilled in the art by reference to the following specification, claims, and appended drawings.

Figure 1:
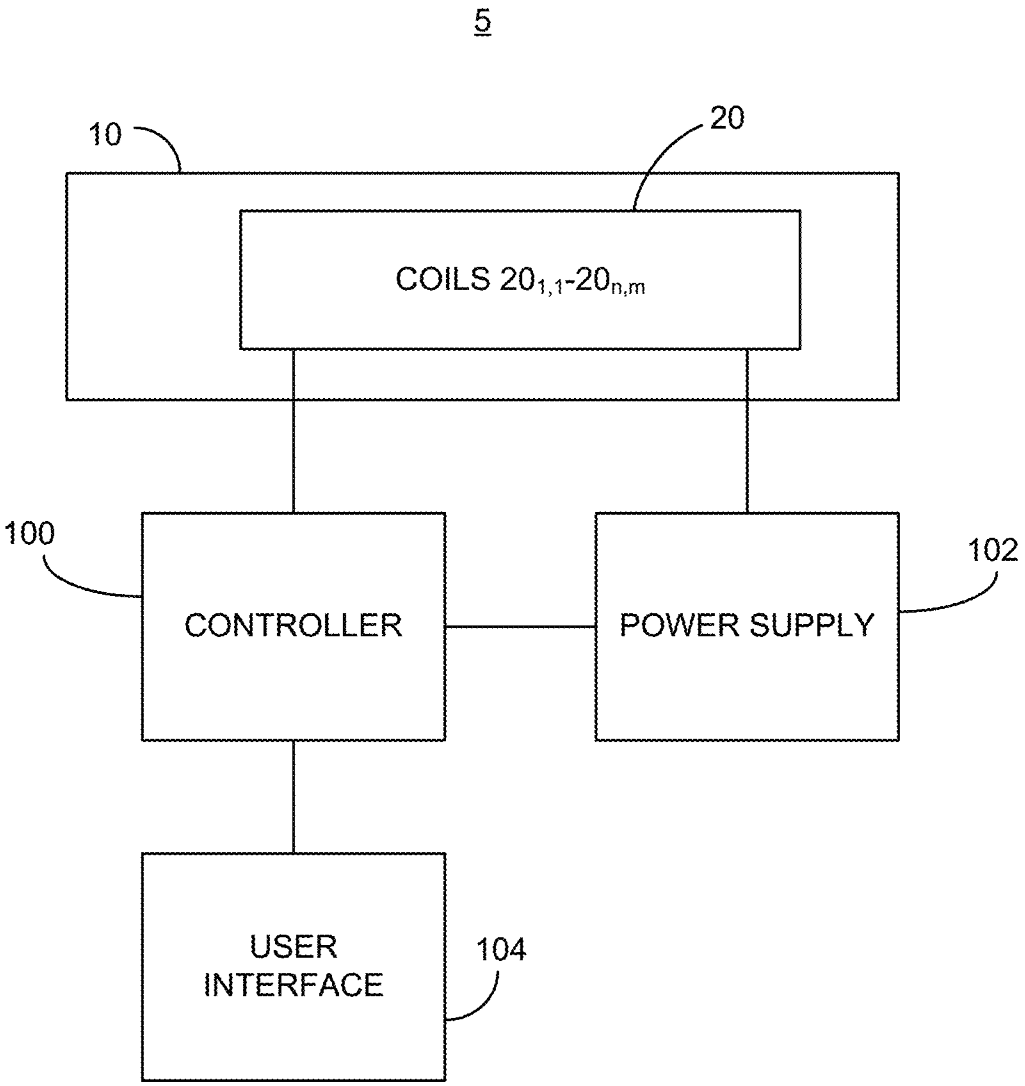
FIG. 1 is an electrical circuit diagram in block form, showing the basic electrical components of a flexible induction cooktop system.

The components in the figures are not necessarily to scale, emphasis instead being placed upon illustrating the principles described herein.

DETAILED DESCRIPTION

The present illustrated embodiments reside primarily in combinations of method steps and apparatus components related to an induction cooktop. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 3:
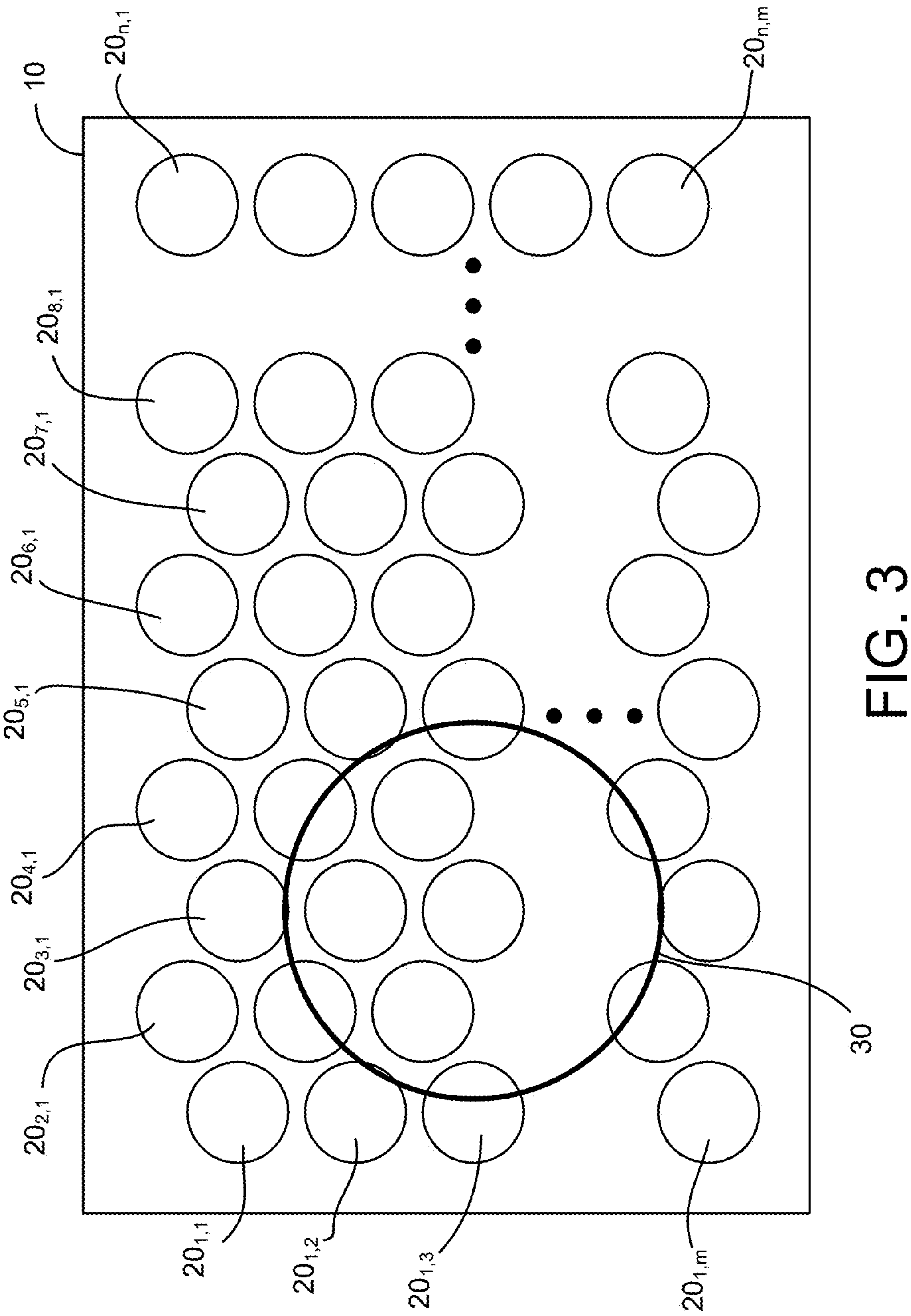
FIG. 3 is a schematic top view of a first flexible induction cooktop having a large number of generally circular coils.

For purposes of description herein, the terms "upper," "lower," "right," "left," "rear," "front," "vertical," "horizontal," and derivatives thereof shall relate to the disclosure as oriented in FIG. 3. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The description below relates to a "flexible induction cooktop," which is defined herein as an induction cooktop having a large number of coils that are distributed next to each other in a non-overlapping manner to form mono-dimensional or bi-dimensional arrays. By providing a large number of smaller adjacent coils, the cookware item(s) may be placed anywhere on the cooktop and only those coils underlying the cookware item(s) are energized. Thus, a flexible induction cooktop differs from a fixed induction cooktop in that a fixed induction cooktop requires the cookware items to be placed in designated locations on the cooktop whereas a flexible induction cooktop does not.

FIG. 1 shows a block diagram of the basic electrical components of a flexible induction cooktop system 5. A controller 100, such as a microprocessor or the like, is coupled to each of the coils $\mathbf{20}_{1,1}$-$\mathbf{20}_{n,m}$ of the induction cooktop 10 and to a power supply 102 and a user interface 104. In general, the controller 100 will respond to activation of an input on the user interface 104 to detect the presence, size, shape, orientation, and position of any cookware item (s) 30 on the induction cooktop 10. Examples of how the controller 100 may detect the presence, size, shape, orientation, and position of any cookware item(s) 30 on the induction cooktop 10 are disclosed in commonly-assigned U.S. application Ser. No. 16/946,098 entitled "SYSTEM AND METHOD FOR IDENTIFYING COOKWARE ITEMS PLACED ON AN INDUCTION COOKTOP," filed on Jun. 5, 2020 by Andrea Gallivanoni et al., and commonly-assigned U.S. application Ser. No. 16/946,101 entitled "SYSTEM AND METHOD FOR IDENTIFYING COOKWARE ITEMS PLACED ON AN INDUCTION COOKTOP," filed on Jun. 5, 2020 by Andrea Gallivanoni et al., the entire disclosures of which are incorporated herein by reference. Once the size, shape, orientation, and position of any cookware item(s) 30 are identified, the controller 100 will control the power supply 102 to supply an appropriate power level to the coils $\mathbf{20}_{1,1}$-$\mathbf{20}_{n,m}$ underlying the cookware item (s) 30 in order to heat food in the cookware item(s) 30.

The user interface 104 may be any conventional user interface and may include various inputs such as temperature settings and timers or the like.

In induction cooktops, the power delivered to a pot placed on an induction hob can be controlled by modifying the switching period, or alternatively the frequency, of the high-frequency signal driving the power converter. The exact relationship between switching period and delivered power, however, depends heavily on other factors, such as the pot material, pot size, pot position relative to the hob, distance between the induction coil and the pot, and so on. One such factor is the interaction with other coils, where the interaction can be either electrical, via connection of the coils to a common bus, or electromagnetic, due to the magnetic flux linkage among coils that are close to each other. In flexible induction cooktops, and particularly in induction cooktops having a large number of coils, this latest factor is particularly important, due to the large number of coils present in the cooktop. In particular, during the cooking process, the factors related to the pot either do not change, for example, the pot shape, or change slowly, for example the material properties can vary due to temperature effects. Such slow changes give the system ample time to adapt and respond to the change, thus maintaining the control over the power delivered to the pot. On the other hand, the selection of which coils are active at any given time during the cooking process can, and often does, vary much more quickly, for example when the coils are controlled using an on-off control strategy for power modulation, as in European Patent Publication No. EP2731402, or using an energy token control strategy as in European Patent Publication No. EP3432682, and so the system has much more difficulty keeping up with the changes.

Figure 2:
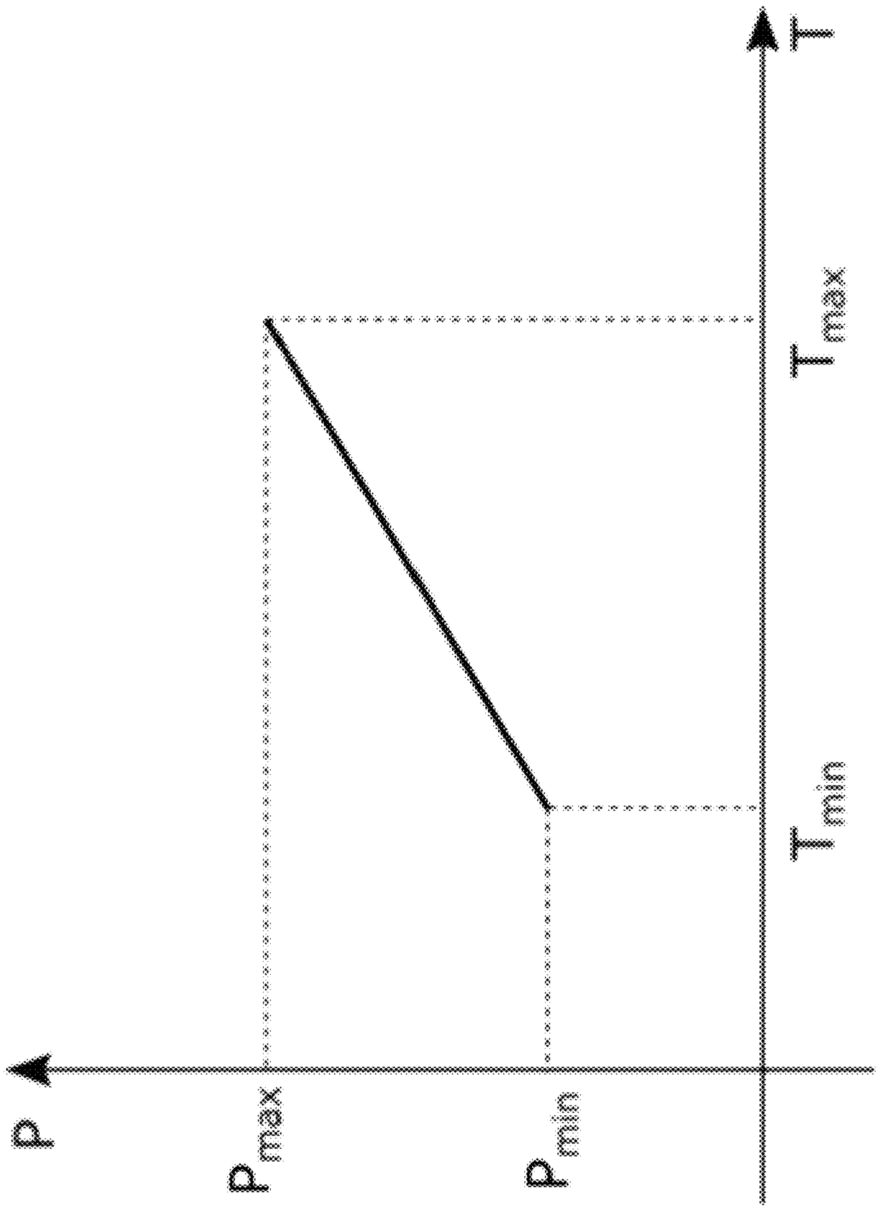
FIG. 2 is a graph showing an example of a load curve, detailing the Power vs. Switching Period relationship.

The power P vs. switching period T relationship can be represented by a load curve, one example of which is shown in FIG. 2, for a given coil-pot combination. The change in this relationship given by the interaction with a neighboring coil, that might or might not be covered by the same pot, can have the effect of a shift of the load curve towards higher or lower powers, or to higher or lower switching periods. Or the effect can be a change in the slope of the curve, or in the width of the support, which can be made either wider or narrower.

In order for the system to be able to control the power delivered by all the coils, it has to have available the load curves for all the possible combinations of active and inactive coils. While this is possible when the number of coils is limited, this becomes untenable as soon as the number of coils starts to increase. In fact, the number of curves to memorize is given, in the most extreme case, by $2^n$-1, where n is the number of coils. This most extreme case happens when there is a non-negligible interaction between all possible groupings of coils in the cooktop. Such a large number of curves would not only require a large memory to keep track of all the curves, but also a large time would need to be spent, first to acquire the curves in the first place, and then, periodically, to refresh them. The refresh is necessary to account for any change that can be caused by a slower factor, as described earlier, such as thermal effects, or the user moving, replacing, or adding a pot, or changing the power request for a pot. Since the curve acquisition (and refresh) time is proportional to the number of curves, this time also grows exponentially with the number of coils. On the other hand, the refresh should be carried out quickly enough to actually follow those slow changes. For a large enough number of coils, the curve acquisition time would be larger than the desired refresh period, thus leaving no time at all for actually delivering the power necessary for the cooking process. For example, consider the case where the desired refresh period is 1 second, and the acquisition of each curve needs a dedicated allotted time. It is advantageous to have the acquisition of each curve carried out at the peak of the mains half-wave, so that all curves are acquired at the maximum voltage; this means that it is only possible to acquire one curve for each mains half-wave, i.e. every 10 ms for a 50-Hz mains line, and every 8.33 ms for a 60-Hz mains line. The number of available half-waves in each refresh period is 100 or 120, respectively. In the most extreme case, where the system keeps track of all the possible coil combinations, with just seven coils the number of curves to acquire would be 127, i.e., already larger than the number of available half-waves in a typical one-second control period.

However, the magnetic flux linkage among coils quickly decreases with distance, and the electrical interaction via connection to a common bus can be reduced by filtering. This means that the actual number of curves that needs to be acquired is lower, and depends on which pair or groups of coils do not have magnetic interactions with each other.

The proposed method eliminates the need of acquiring all the possible curve combinations, thus limiting both the memory occupation and the curve acquisition time necessary at every refresh. In addition, the proposed method greatly reduces, or eliminates altogether, the need to keep track of the interactions between coils active at the same time.

European Patent Publication No. EP3432682 (mentioned above) describes a method for operating a flexible induction cooktop using an "energy token" allocation algorithm and describes the concept of load curves. In the described method, a group of coils is identified which can be operated at the same time, based on the concept of partial overlapping of power characteristic curves; however, no mention is made of the possible interaction of adjacent coils, and the effect this would have on the power curves.

PCT Publication No. WO2017093168A1 describes a method for controlling a power of an all-surface inductive cooking appliance having a plurality of coils in an array, wherein at least two adjacent coils are driven by two separate power sources that apply current in 180° different phases or by a single power source. However, this method does not address the need to keep track of the excessive interactions between coils active at the same time.

The proposed methods improve upon the methods described in European Patent Publication No. EP3432682 and PCT Publication No. WO2017093168A1 by eliminating, or at least greatly reducing, the possibility of said interaction to have an effect on the coil activation selection and sequence.

The proposed methods described below control the activation sequence of coils of a flexible induction cooktop. FIG. 3 shows a flexible induction cooktop 10 characterized by having a large number of coils $\mathbf{20}_{1,1}$-$\mathbf{20}_{n,m}$, whose dimensions are typically smaller than the size of a cookware item, and these coils $\mathbf{20}_{1,1}$-$\mathbf{20}_{n,m}$ are distributed next to each other in a non-overlapping manner to form mono-dimensional or bi-dimensional arrays where n is the number of columns of the array and m is the number of rows.

The proposed methods activate the coils in a flexible induction cooktop in such a way that coils that are adjacent, or within a predefined distance from each other, would not be allowed to be activated at the same time.

Such method results in the interactions, either electrical or electromagnetic in nature, between coils that are active at the same time, to be eliminated, or at least greatly reduced.

Figure 4:
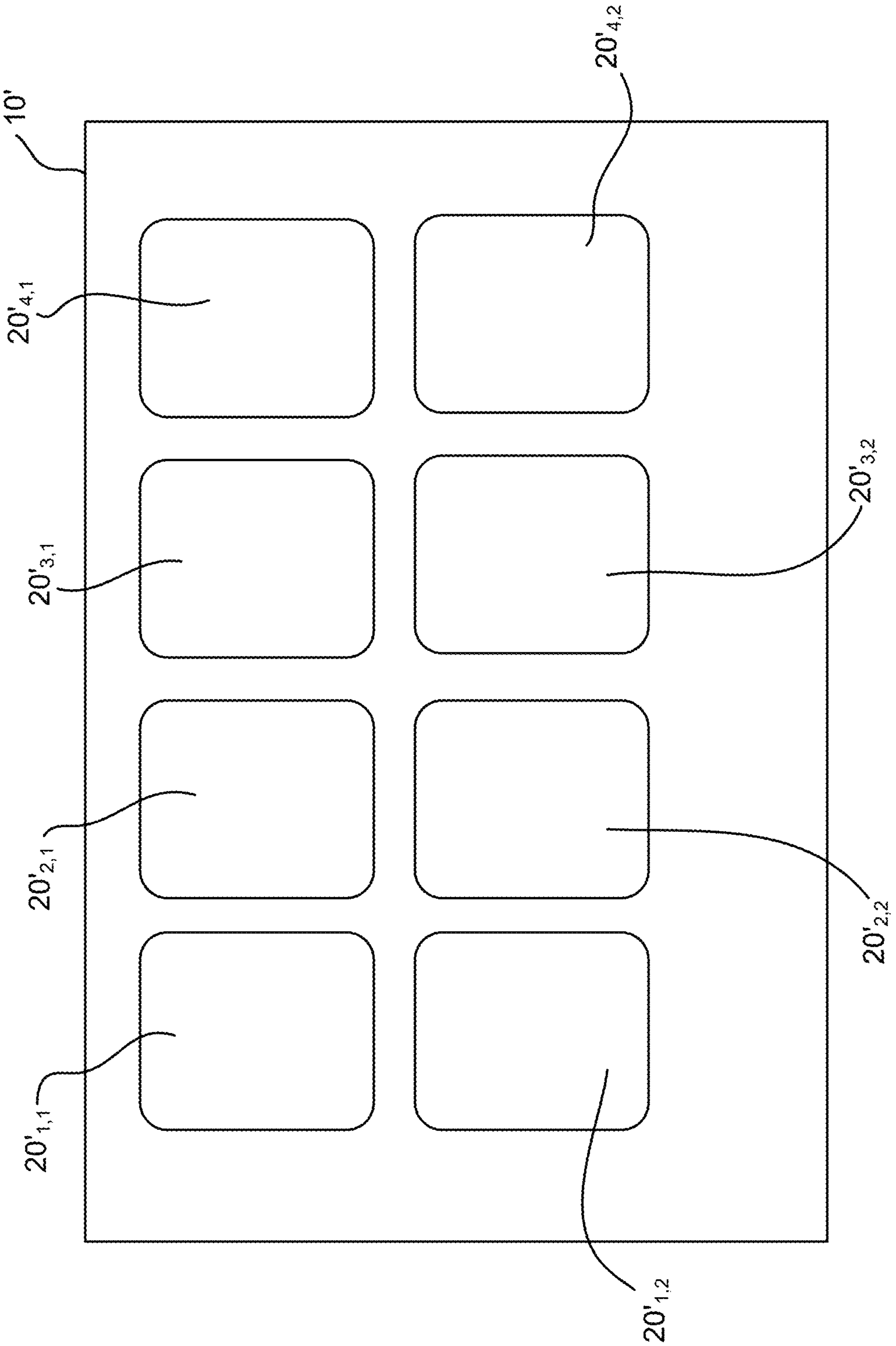
FIG. 4 is a schematic top view of a second flexible induction cooktop having a number of generally rectangular coils.

The description that follows references two types of flexible induction cooktops. An example of the coil arrangement in a first flexible induction cooktop 10 is shown in FIG. 3 where a large number (e.g., greater than seven) of coils $\mathbf{20}_{1,1}$-$\mathbf{20}_{n,m}$ are shown. An example of the coil arrangement in a second flexible induction cooktop 10' is shown in FIG. 4 where the coils $\mathbf{20}_{1,1}\mathbf{20}_{4,2}$ are generally rectangular in shape. In this description, features of both types of cooktops use the same reference numbers except that a prime symbol "'" is added for the second flexible induction cooktop 10'. Further, the coils $\mathbf{20}_{1,1}$-$\mathbf{20}_{n,m}$ may generally be referred to with the reference numeral 20 or 20'.

In this embodiment, when the controller 100 selects a group of coils 20 to be activated simultaneously, the controller 100 preferentially selects coils 20 that are not adjacent to any of the other coils in the group; specifically, the controller 100 may use a minimum distance between the selected coils 20 as a first criteria. Such distance can be either a geometrical distance, based purely on the physical placement of the coils 20 relative to each other, or a topological distance, i.e., based on how many coils 20 are to be skipped when moving along a grid connecting adjacent coils.

In addition to said distance, other criteria which can be used in determining the selection of the coils 20 to be activated are possible, and can include, as non-limiting examples, the preferential inhibition of selecting coils adjacent to coils already included in the group; in cases where the coils are not circular, for example, those shown in FIG. 4, where the magnetic interaction between coils facing on the longer side is stronger than the one between coils facing on the shorter side, the preferential inhibition of selecting coils adjacent only to the longer side to coils already included in the group.

Figure 5:
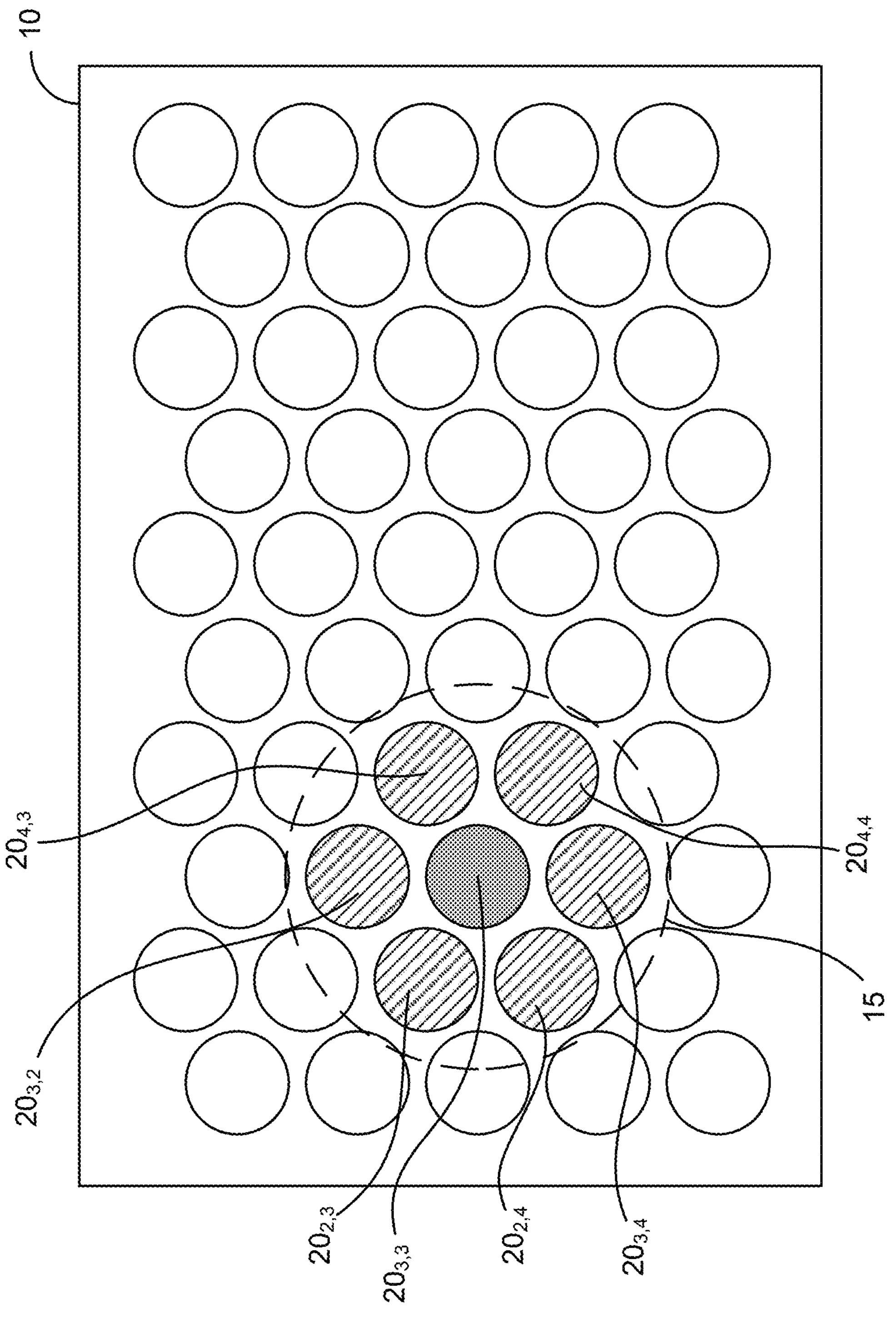
FIG. 5 is a schematic top view of the first flexible induction cooktop having a group of coils with one coil receiving power and other coils not receiving power according to a first example.

An example of the first criterion is shown in FIG. 5. In this case, the first coil to be selected is coil $\mathbf{20}_{3,3}$, which is shaded dark gray for purposes of illustration only. The controller 100 then uses a threshold distance, which can be either predetermined or calculated based on information acquired during the previous operation of the cooktop 10, to establish which of the remaining coils 20 are eligible to be selected as well, and which are to be avoided during the selection process. The distance between the coils, which is compared to the threshold distance, can be preferably determined by the distance between the centers of the two considered coils, but another option is the distance between the closest points of the two considered coils. Other options for the determination of said distance are possible as well. This threshold distance is represented in FIG. 5 by the dashed circle 15. In this case, the threshold is compared with the distance between coil centers, and therefore all coils (20$_{2,3}$, 20$_{2,4}$, 20$_{3,2}$, 20$_{3,4}$, 20$_{4,3}$, 20$_{4,4}$) whose center falls within the dashed circle 15 are not eligible to be added to the cluster, and these coils (20$_{2,3}$, 20$_{2,4}$, 20$_{3,2}$, 20$_{3,4}$, 20$_{4,3}$, 20$_{4,4}$) are marked in FIG. 5 with diagonal hatching for purposes of illustration.

Figure 6:
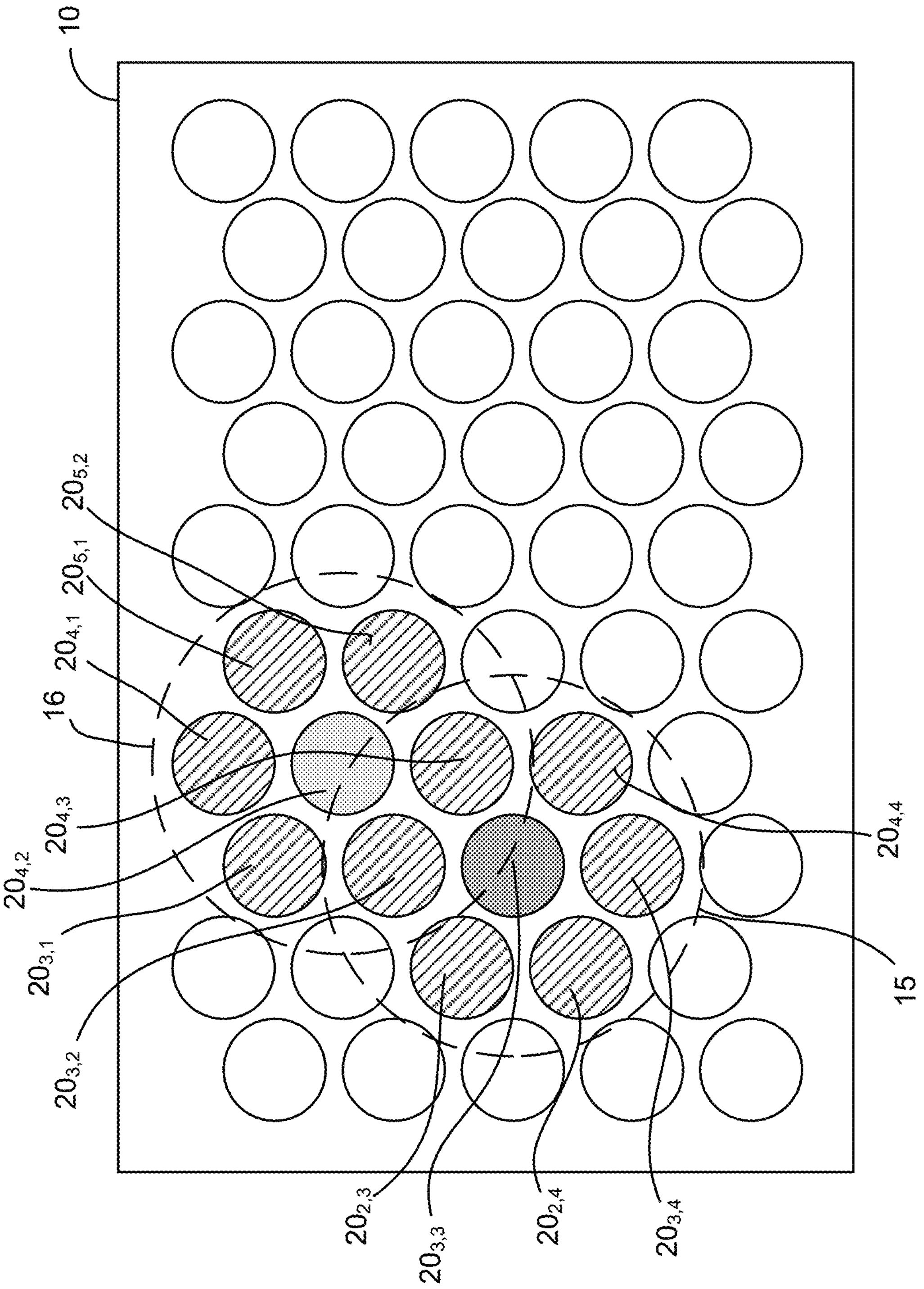
FIG. 6 is a schematic top view of the first flexible induction cooktop having two groups of coils with two coils receiving power and other coils not receiving power according to a second example.

After adding a second coil to the group, its own restrictions on minimum distance have to be considered for the addition of further coils to the group. For example, in FIG. 6, the second selected coil 20$_{4,2}$ is shaded light gray; the corresponding "forbidden zone" is represented by a dashed circle 16, and the non-eligible coils (20$_{2,3}$, 20$_{2,4}$, 20$_{3,2}$, 20$_{3,4}$, 20$_{4,3}$, 20$_{4,4}$, 20$_{3,1}$, 20$_{4,1}$, 20$_{5,1}$, 20$_{5,2}$) are marked in FIG. 6 with diagonal hatching. It is to be understood that the "forbidden zones" determined by starting from different activated coils can overlap, and thus some of the coils, such as coils 20$_{3,2}$ and 20$_{4,3}$ in this example, are marked as "preferably not activated" twice, but this does not change the outcome of the method.

Such considerations are further extended when considering additional coils that have been added to the group.

Figure 7:
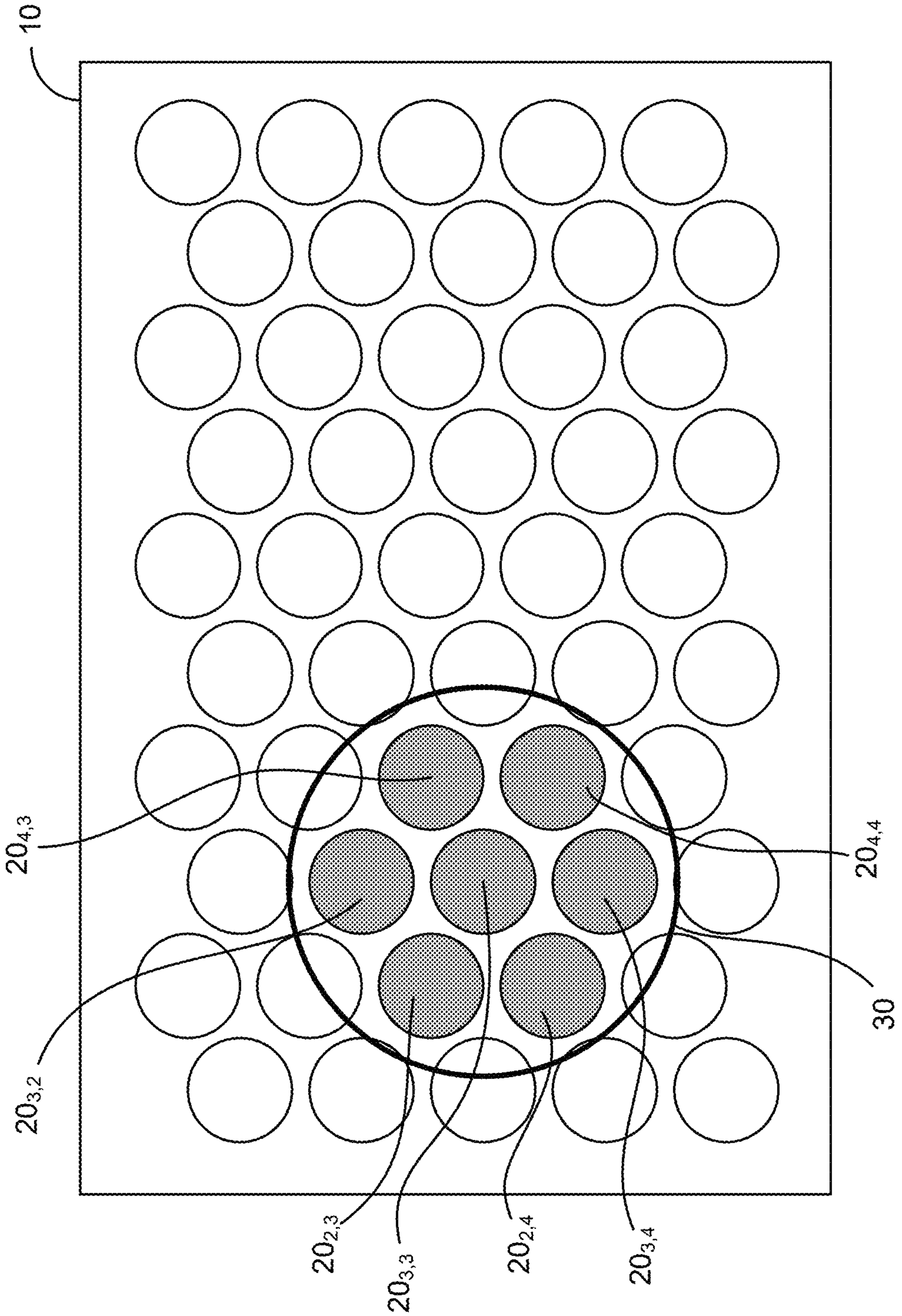
FIG. 7 is a schematic top view of the first flexible induction cooktop having a group of coils underlying a cookware item.

It should be understood that coils that are preferentially avoided will not be activated simultaneously with the selected coil(s) but are totally entitled to be activated or energized in preceding or subsequent time slots wherein the selected coil(s) is (are) not activated/energized. In other words, by simultaneous activation, it is meant that the coils are not supplied with high frequency current at the same time. As a clarification of this point, the following figures show an example of an actuation sequence for the coils associated with a cookware item 30, as shown in FIG. 7. In FIG. 7, the cookware item 30 placed on the cooktop 10 is indicated by the thick outline; the coils (20$_{2,3}$, 20$_{2,4}$, 20$_{3,2}$, 20$_{3,3}$, 20$_{3,4}$, 20$_{4,3}$, 20$_{4,4}$) that the controller 100 will sequentially activate to transfer energy to the cookware item 30 are highlighted in dark gray.

In the group of coils (20$_{2,3}$, 20$_{2,4}$, 20$_{3,2}$, 20$_{3,3}$, 20$_{3,4}$, 20$_{4,3}$, 20$_{4,4}$) that are associated with the cookware item 30, each coil is adjacent to at least three other coils, therefore the system will not activate all the coils in the group at the same time. Instead, it determines an activation sequence, in this case in three time steps, which abides by the criterion just presented based on the minimum distance, in order to select subgroups of coils to activate, at the same time, in each time step. The three time steps presented here are then repeated over and over, for as long as the user will maintain the pot energized.

Figure 8:
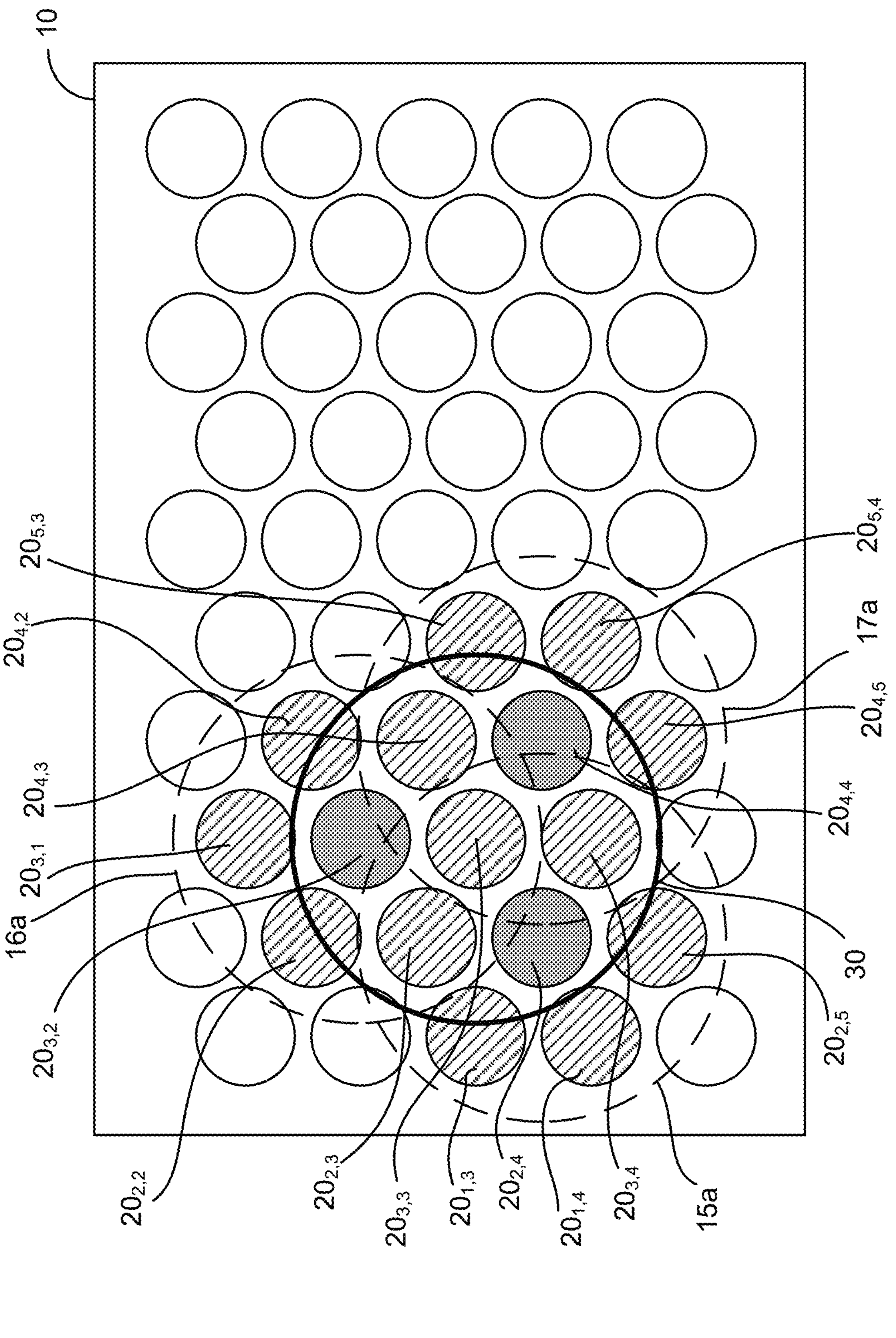
FIG. 8 is a schematic top view of the first flexible induction cooktop having a group of coils underlying a cookware item with three coils receiving power and other coils not receiving power according to a first step of a third example.
Figure 9:
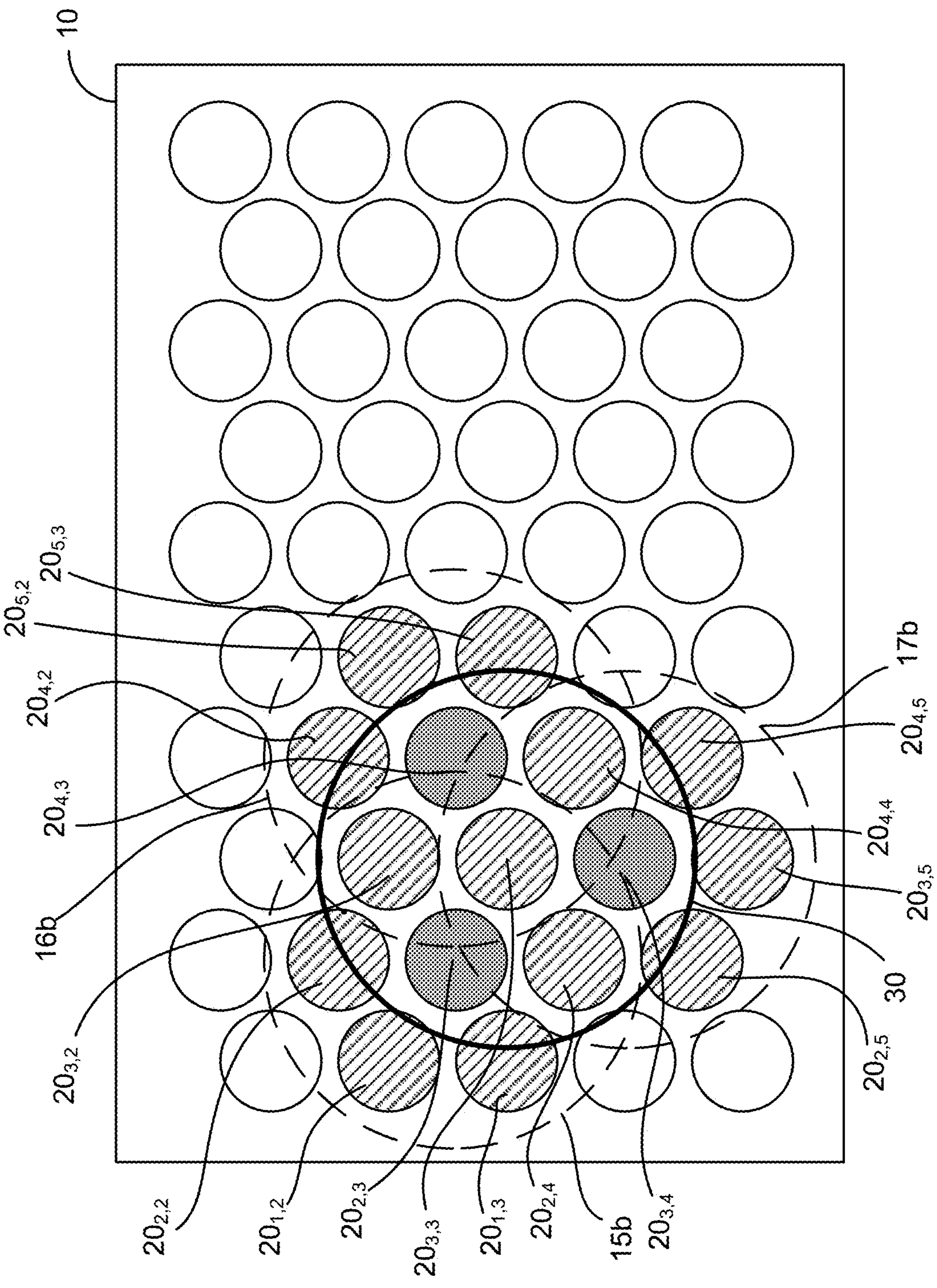
FIG. 9 is a schematic top view of the first flexible induction cooktop having a group of coils underlying a cookware item with three different coils receiving power and other coils not receiving power according to a second step of the third example.
Figure 10:
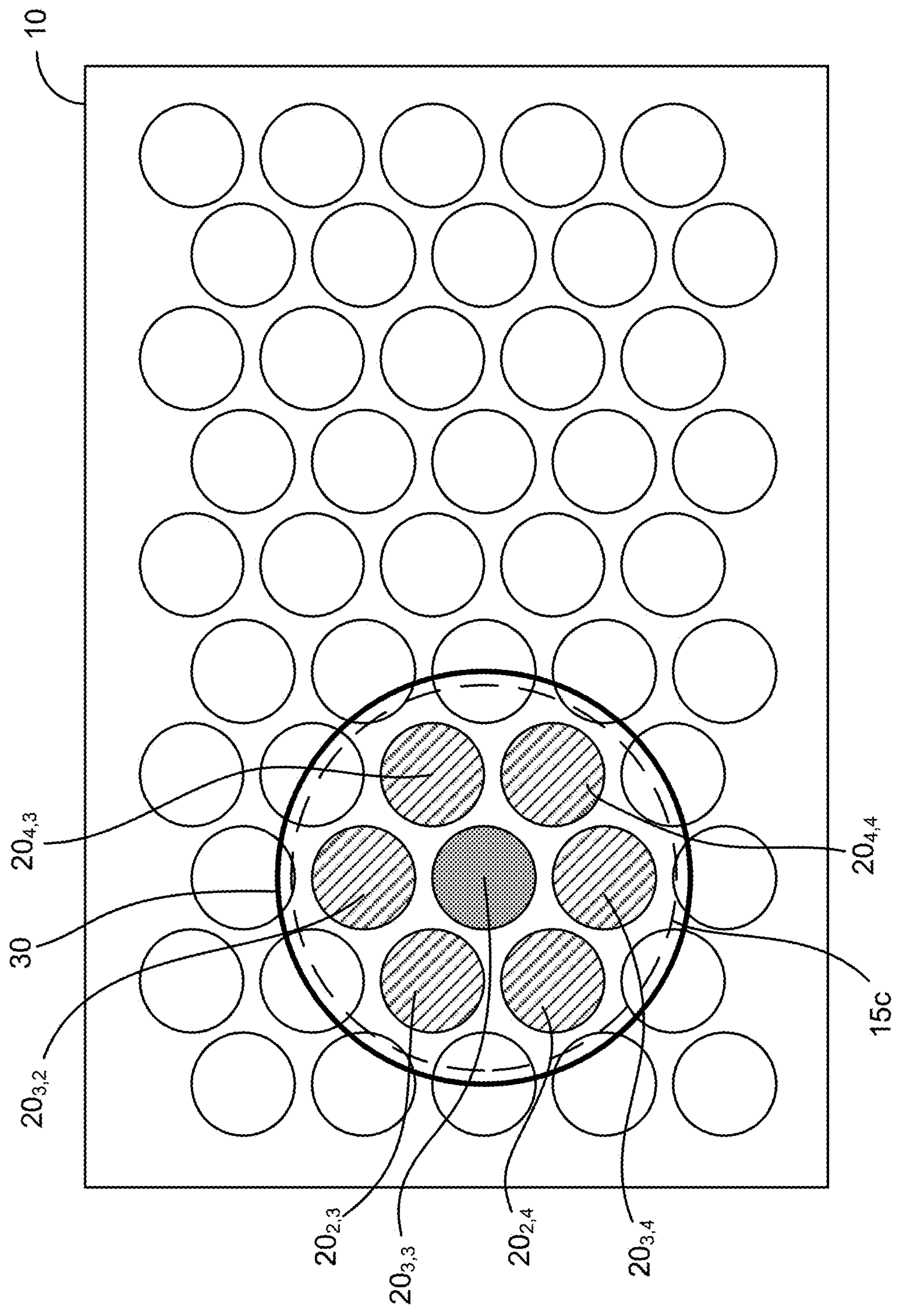
FIG. 10 is a schematic top view of the first flexible induction cooktop having a group of coils underlying a cookware item with one different coil receiving power and other coils not receiving power according to a third step of the third example.

The coil selections for the three time steps are shown in FIGS. 8, 9, and 10. In each of the figures, the active coils are highlighted in dark gray, and the coils that are preferably not activated are shown with diagonal hatching. Looking first at FIG. 8, three coils (20$_{3,2}$, 20$_{2,4}$, and 20$_{4,4}$) are simultaneously activated while the coils adjacent to these three coils are preferably not activated. For example, the coils whose centers fall within the three circles 15*a*, 16*a*, and 17*a* representing the predetermined distances from the three activated coils (20$_{3,2}$, 20$_{2,4}$, and 20$_{4,4}$) are not activated. Then, after a designated time, three different coils (20$_{2,3}$, 20$_{3,4}$, and 20$_{4,2}$) are simultaneously activated while the adjacent coils whose centers fall within the three circles 15*b*, 16*b*, and 17*b* representing the predetermined distances from the three activated coils (20$_{2,3}$, 20$_{3,4}$, and 20$_{4,2}$) are preferably not activated as shown in FIG. 9. Next, after another designated time, another coil 20$_{3,3}$ is activated and the adjacent coils (within circle 15*c*) are preferably not activated as shown in FIG. 10.

As can be seen, coils that are active in any of the time steps are marked as preferably not activated in the other time steps. Therefore, the condition of being "preferably not activated" is only temporary for a given time step, and only to be seen relative to which coils have already been selected to be activated at that time step.

Figure 11:
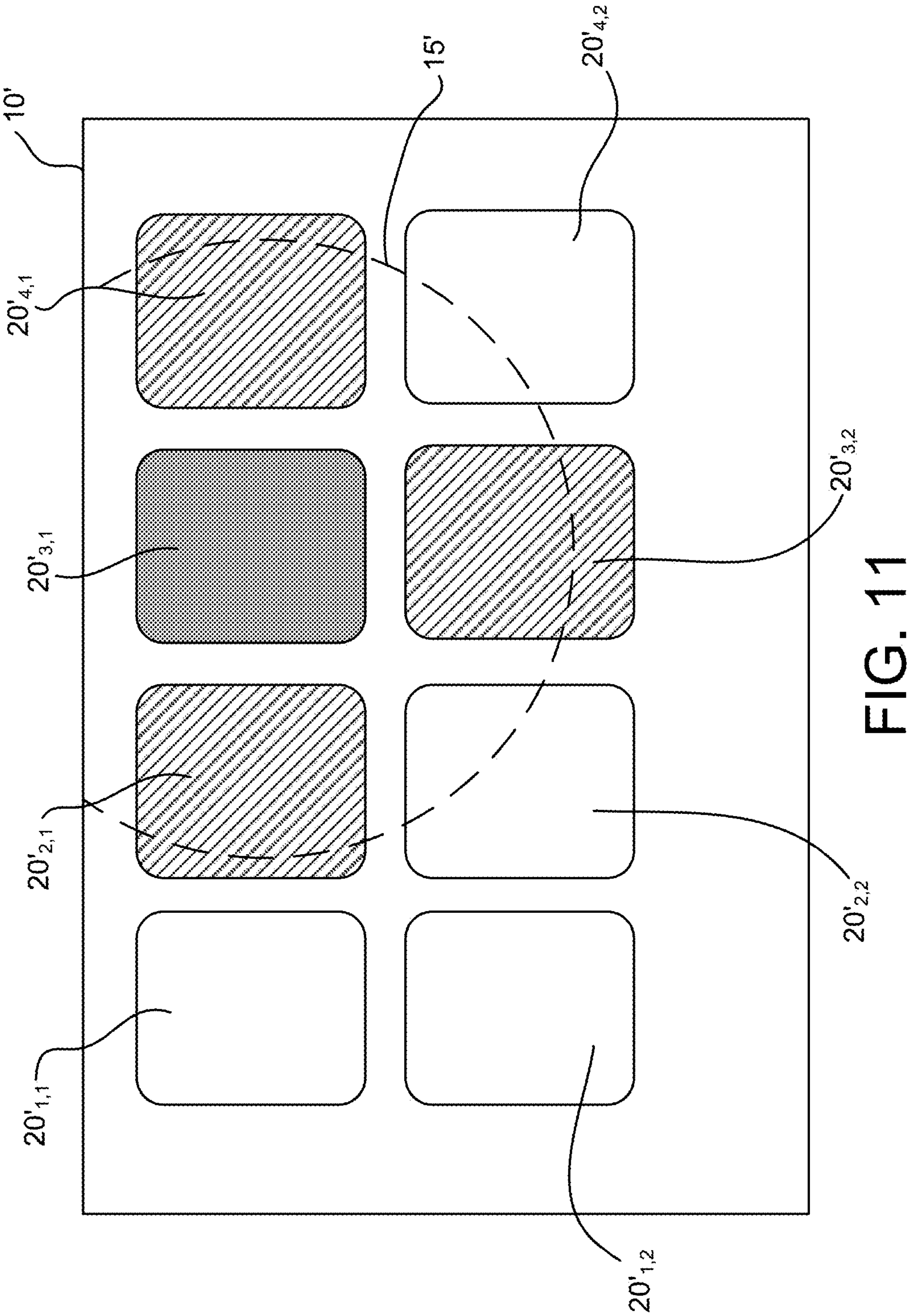
FIG. 11 is a schematic top view of the second flexible induction cooktop having a group of coils with one coil receiving power and other coils not receiving power according to a fourth example.
Figure 12:
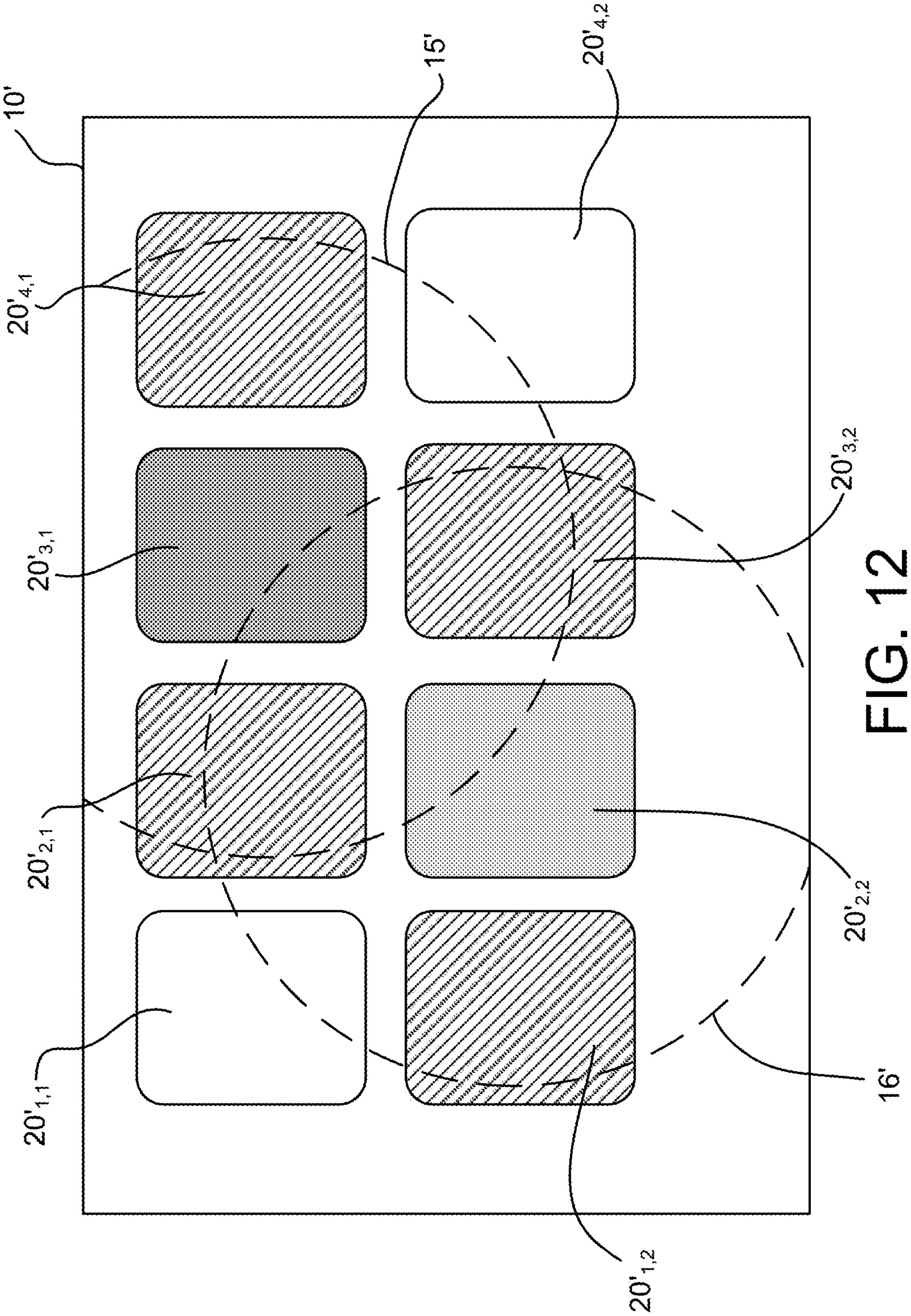
FIG. 12 is a schematic top view of the second flexible induction cooktop having two groups of coils with two coils receiving power and other coils not receiving power according to a fifth example.

Similarly, the application of the first criterion on the second flexible cooktop 10' is shown in FIGS. 11 and 12.

As shown in FIG. 11, the first selected coil 20'$_{3,4}$ is highlighted in dark gray, and the minimum distance is measured from the center of the first selected coil 20'$_{3,1}$. Coils (20'$_{2,1}$, 20'$_{4,1}$, 20'$_{3,2}$) that are preferably not activated are highlighted with diagonal hatching. With this selection of minimum distance represented by the dashed partial circle 15', only the coils (20'$_{2,1}$, 20'$_{4,1}$, 20'$_{3,2}$) neighboring the first selected coil 20'$_{3,1}$ on the sides are preferably not activated, and not the coils 20'$_{2,2}$ and 20'$_{4,2}$ placed at an angle.

After adding a second coil 20'$_{2,2}$ to the group, highlighted in light gray in FIG. 12, an additional coil 20'$_{1,2}$ falling within circle 16' is marked as preferably not activated.

Figure 13:
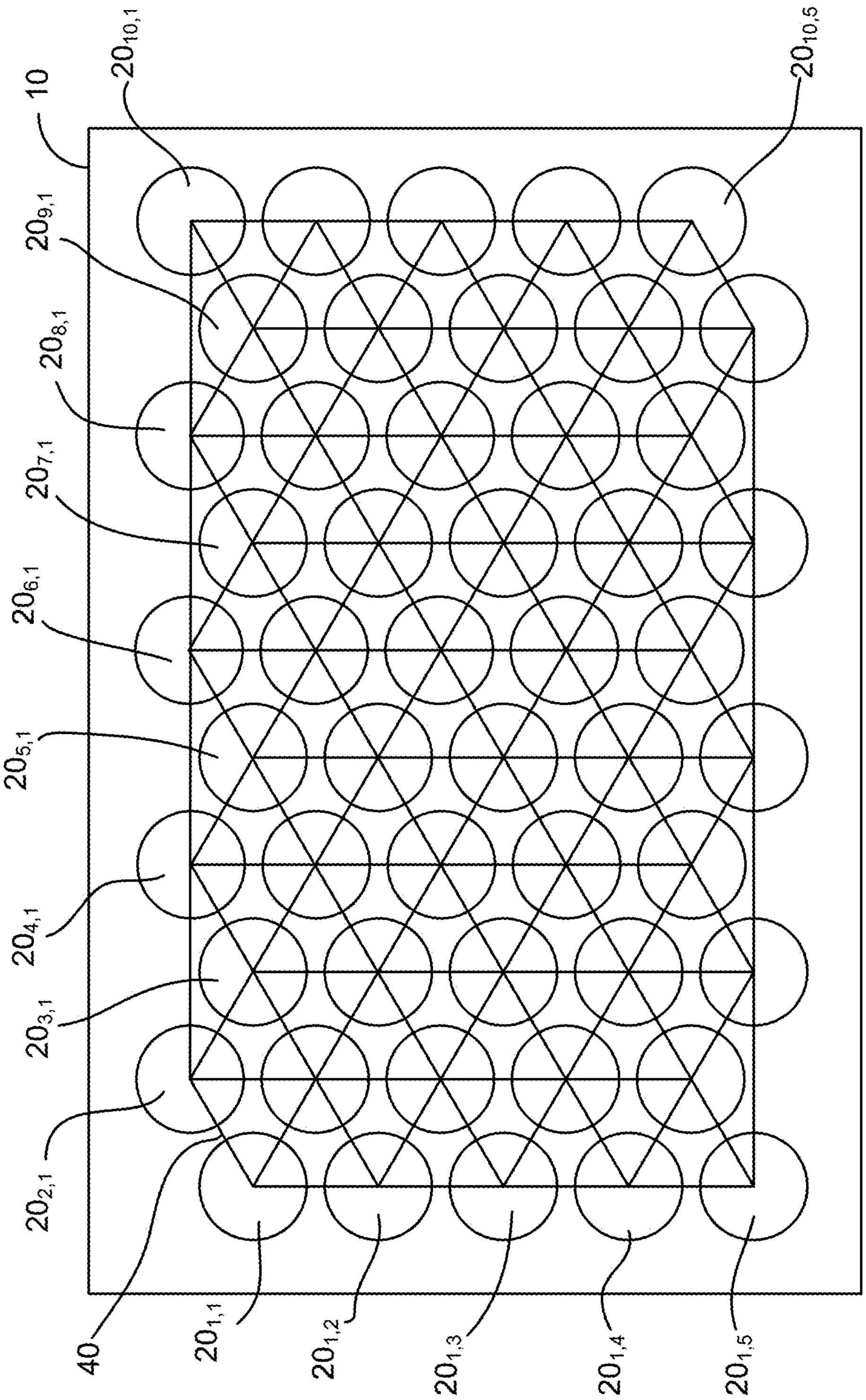
FIG. 13 is a schematic top view of the first flexible induction cooktop having a grid overlying the coils, said grid identifying the adjacent coils.

A second criteria that may be used to determine which coils may be inhibited from activation is to establish a virtual grid 40, 40' connecting the centers of the coils where each "step" along the grid connects adjacent coils. Using the second criteria results in similar behavior as the first criteria, except that a coil is preferentially avoided if it can be reached in a given number of steps from a coil already belonging to the group, when moving along the grid 40, 40' connecting the coil centers. For example, FIG. 13 shows an arrangement of coils 20$_{1,1}$20$_{10,5}$ with such a grid 40 overlaid on top for the first flexible induction cooktop 10. The movements to be considered are along the sides of the triangles that constitute the grid 40 shown.

Figure 14:
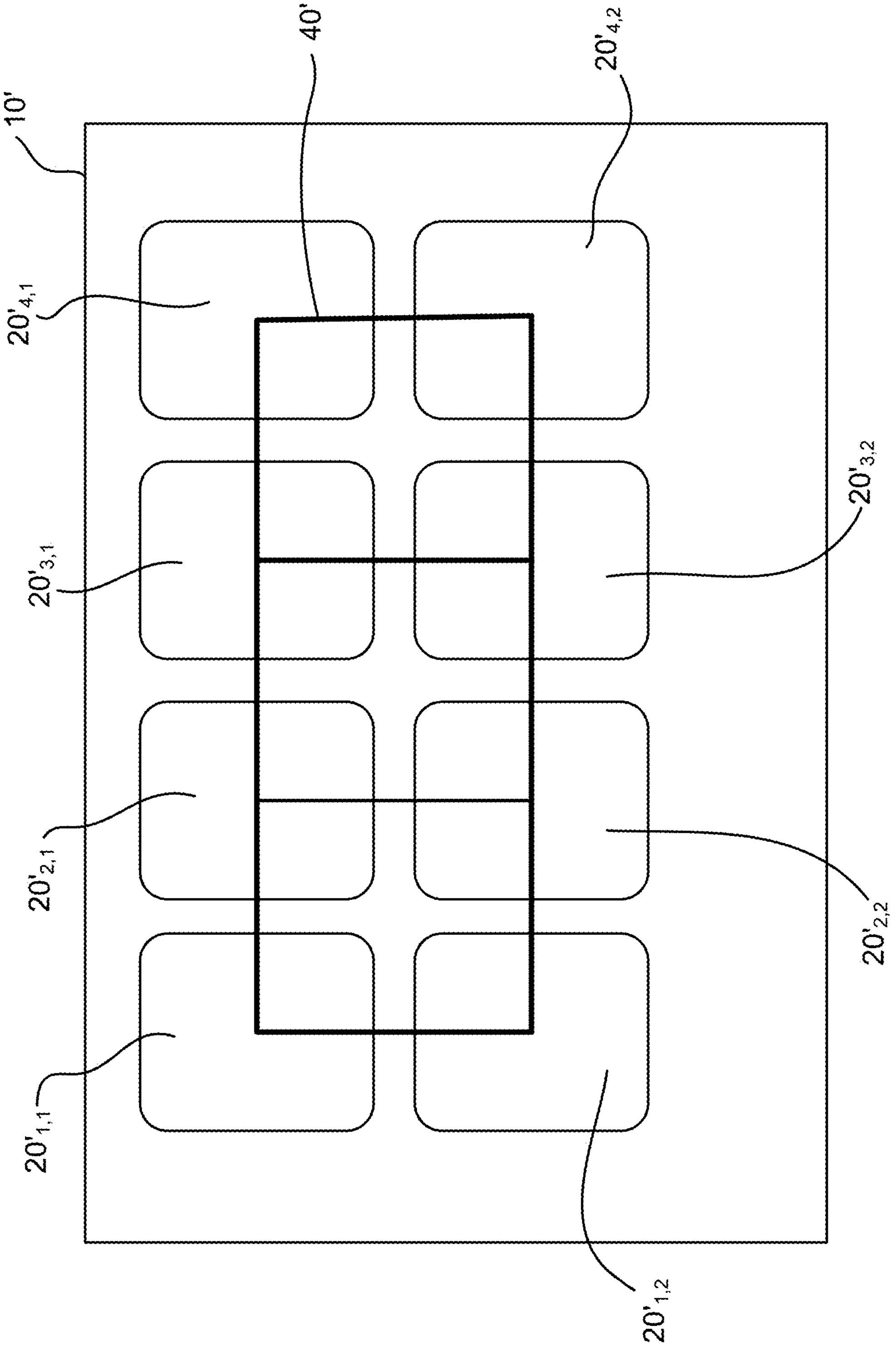
FIG. 14 is a schematic top view of the second flexible induction cooktop having a grid overlying the coils, said grid identifying the adjacent coils.

Similarly, for the second flexible induction cooktop 10', the coil arrangement with the corresponding grid 40' is shown in FIG. 14.

Figure 15:
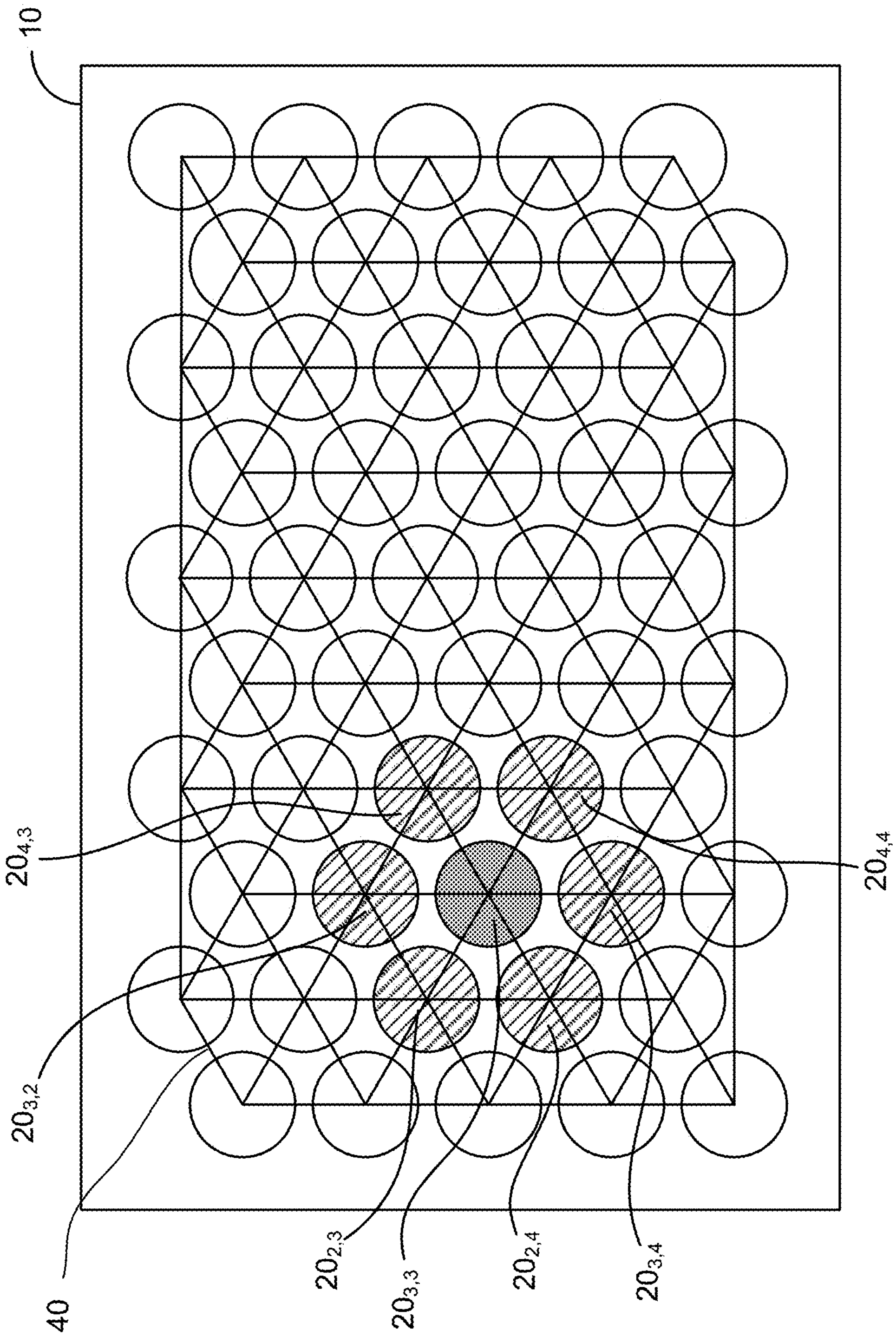
FIG. 15 is a schematic top view of the first flexible induction cooktop having a group of coils with one coil receiving power and other coils not receiving power according to a sixth example.

An example of the operation of the method with this second criterion on the first flexible induction cooktop 10, when setting the number of steps to 1, is shown in FIG. 15, where the first coil to be selected is coil 20$_{3,3}$ shaded in dark gray. The coils (20$_{2,3}$, 20$_{2,4}$, 20$_{3,2}$, 20$_{3,4}$, 20$_{4,3}$, 20$_{4,4}$) that can be reached by moving one step along the grid 40 from the first coil 20$_{3,3}$ selected are diagonally hatched.

Figure 16:
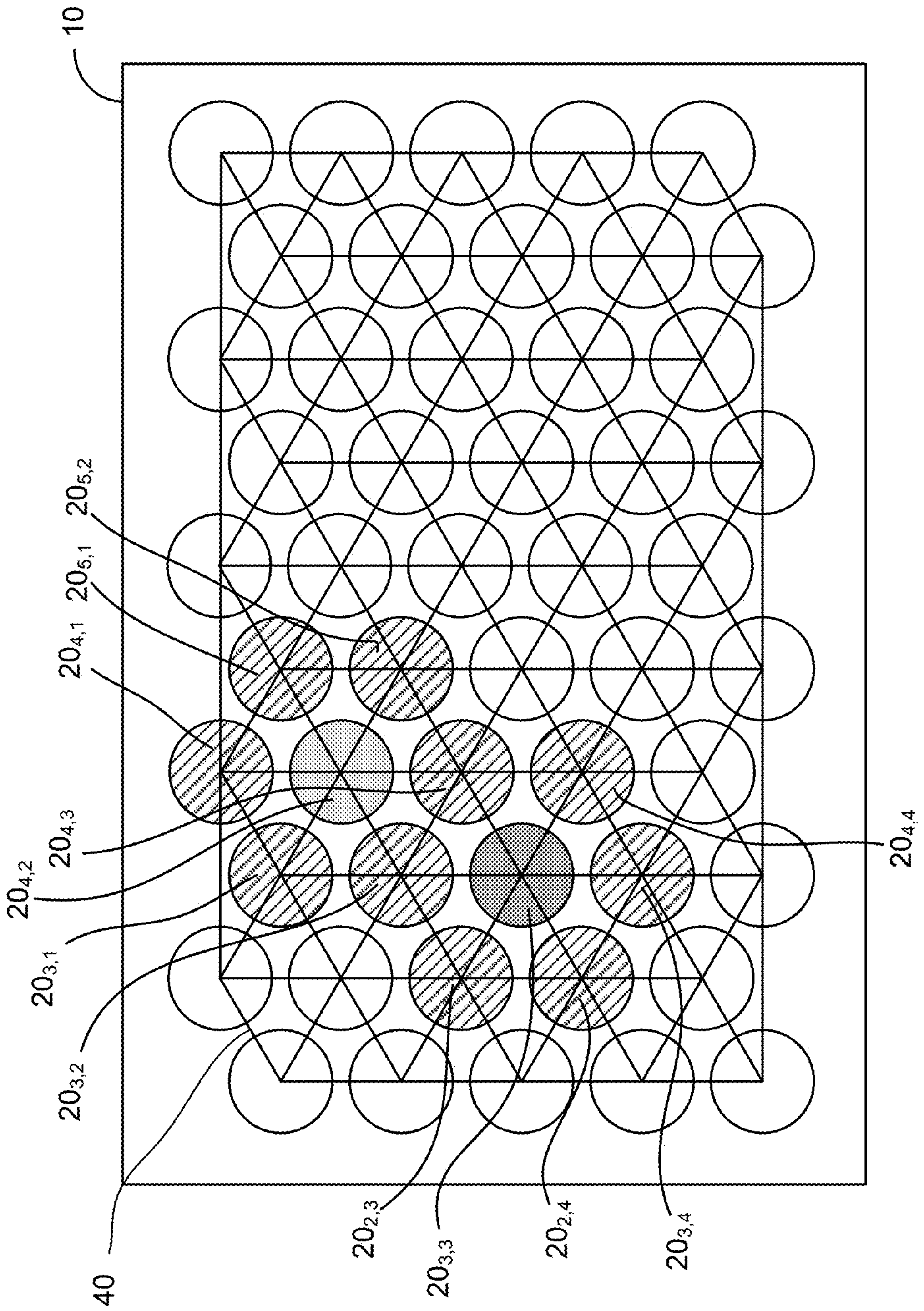
FIG. 16 is a schematic top view of the first flexible induction cooktop having two groups of coils with two coils receiving power and other coils not receiving power according to a seventh example.

After adding a second coil 20$_{4,2}$, represented in FIG. 16 in light gray, additional coils (20$_{3,2}$, 20$_{4,3}$, 20$_{3,1}$, 20$_{4,1}$, 20$_{5,1}$, 20$_{5,2}$) are marked as preferably not activated, and are those that can be reached in one step along the grid starting from the second selected coil 20$_{4,2}$. It is to be understood that some of said additional coils were already marked as preferably not activated based on the adjacency to the first selected coil 20$_{3,3}$, and are therefore not an addition per se, but simply a repeat indication.

Figure 17:
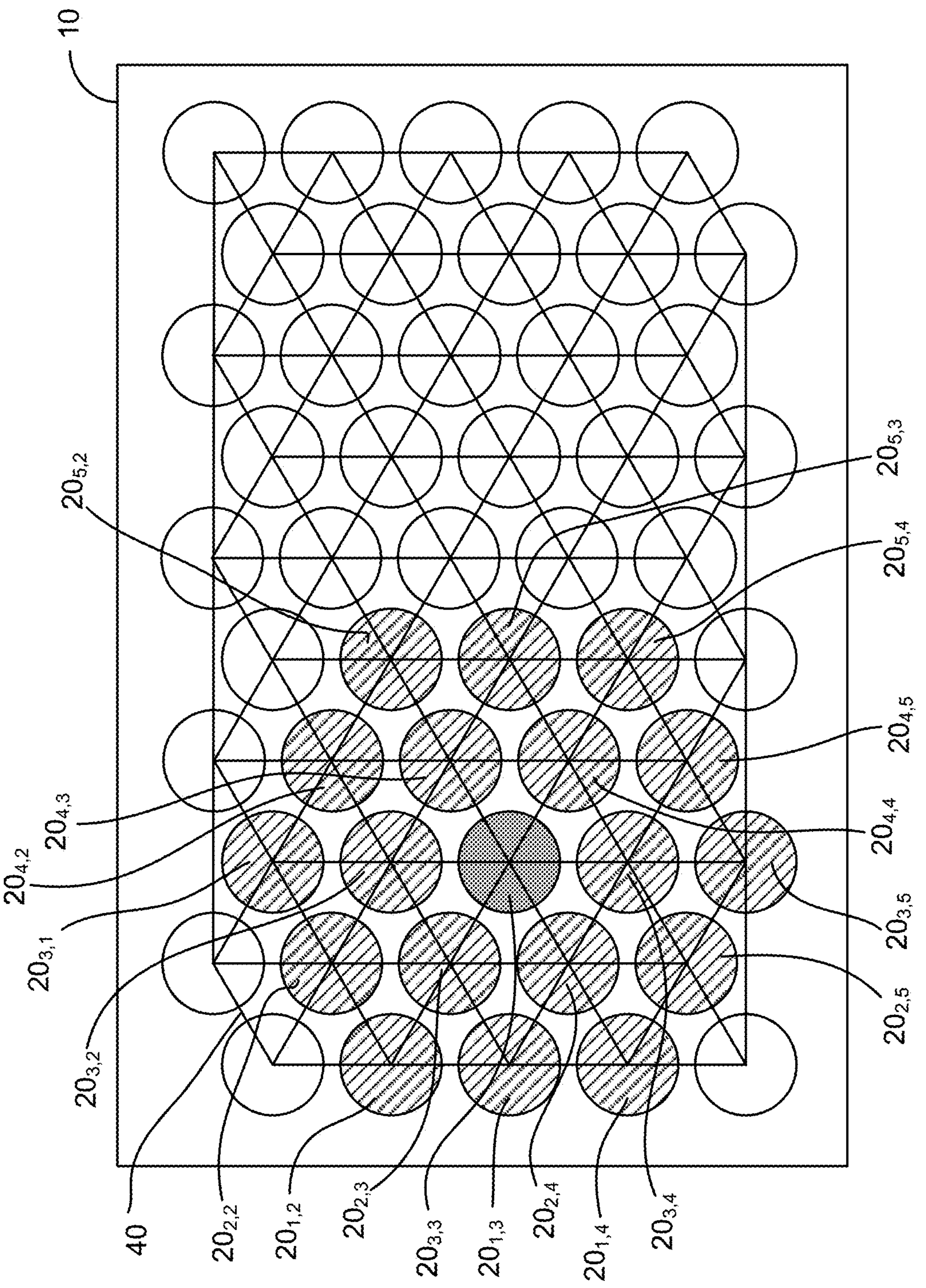
FIG. 17 is a schematic top view of the first flexible induction cooktop having a group of coils with one coil receiving power and other coils not receiving power according to an eighth example.

As a second example of operation of the method with the second criterion on the first flexible induction cooktop 10, this time setting the number of steps to 2, is shown in FIG. 17, where the first coil 20$_{3,3}$ to be selected is indicated in dark gray. The coils (20$_{1,2}$, 20$_{1,3}$, 20$_{1,4}$, 20$_{2,2}$, 20$_{2,3}$, 20$_{2,4}$, 20$_{2,5}$, 20$_{3,1}$, 20$_{3,2}$, 20$_{3,4}$, 20$_{3,5}$, 20$_{4,2}$, 20$_{4,3}$, 20$_{4,4}$, 20$_{4,5}$, 20$_{5,2}$, 20$_{5,3}$, 20$_{5,4}$) that can be reached by moving two steps along the grid 40 from the first coil 20$_{3,3}$ selected are highlighted using diagonal hatching.

Figure 18:
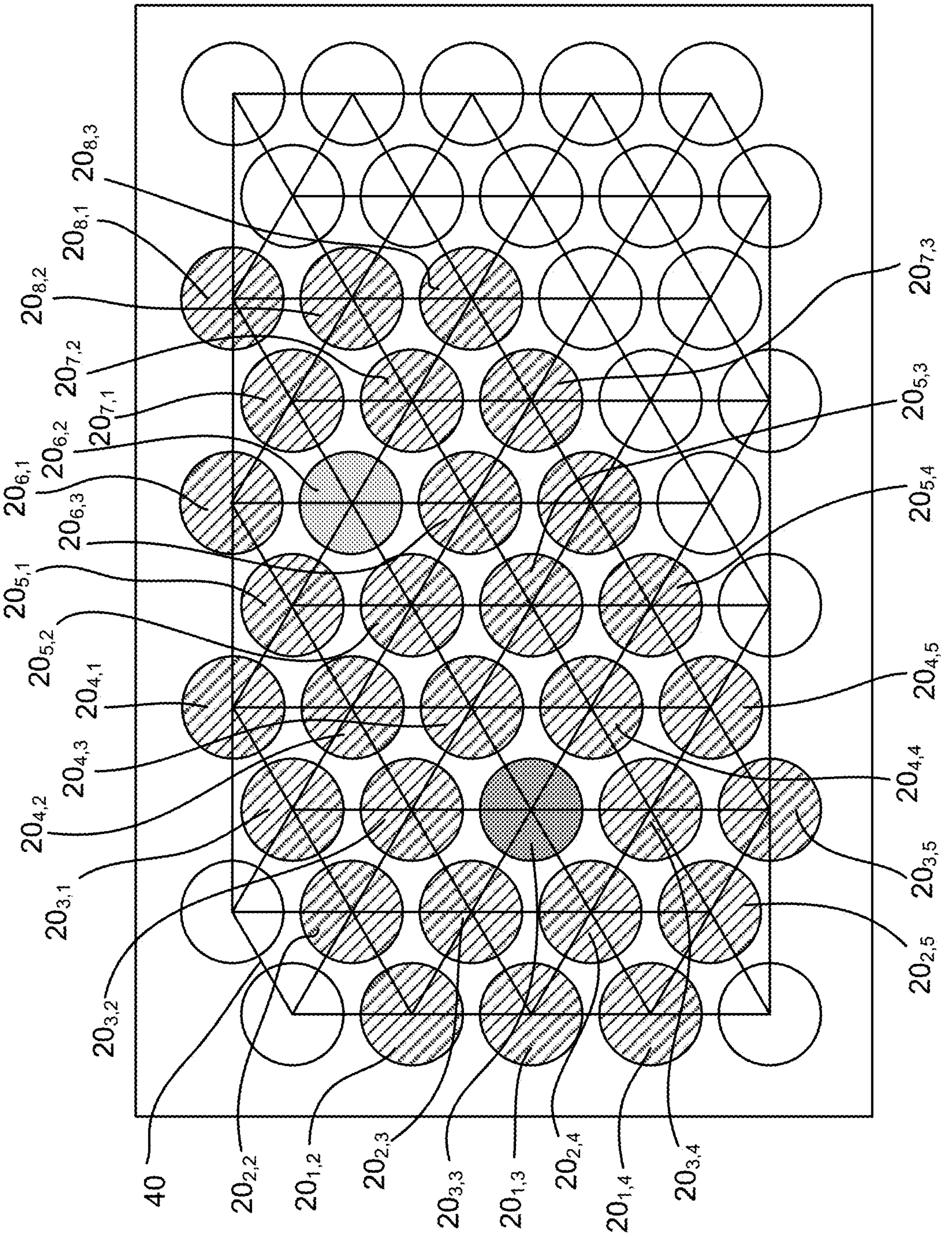
FIG. 18 is a schematic top view of the first flexible induction cooktop having two groups of coils with two coils receiving power and other coils not receiving power according to a ninth example.

After adding a second coil 20$_{6,2}$, represented in FIG. 18 in light gray, additional coils (20$_{4,1}$, 20$_{5,1}$, 20$_{6,1}$, 20$_{6,3}$, 20$_{6,4}$, $20_{7,1}$, $20_{7,2}$, $20_{7,3}$, $20_{8,1}$, $20_{8,2}$, $20_{8,3}$) marked as preferably not activated using diagonal hatching are added around this second coil $20_{6,2}$.

Figure 19:
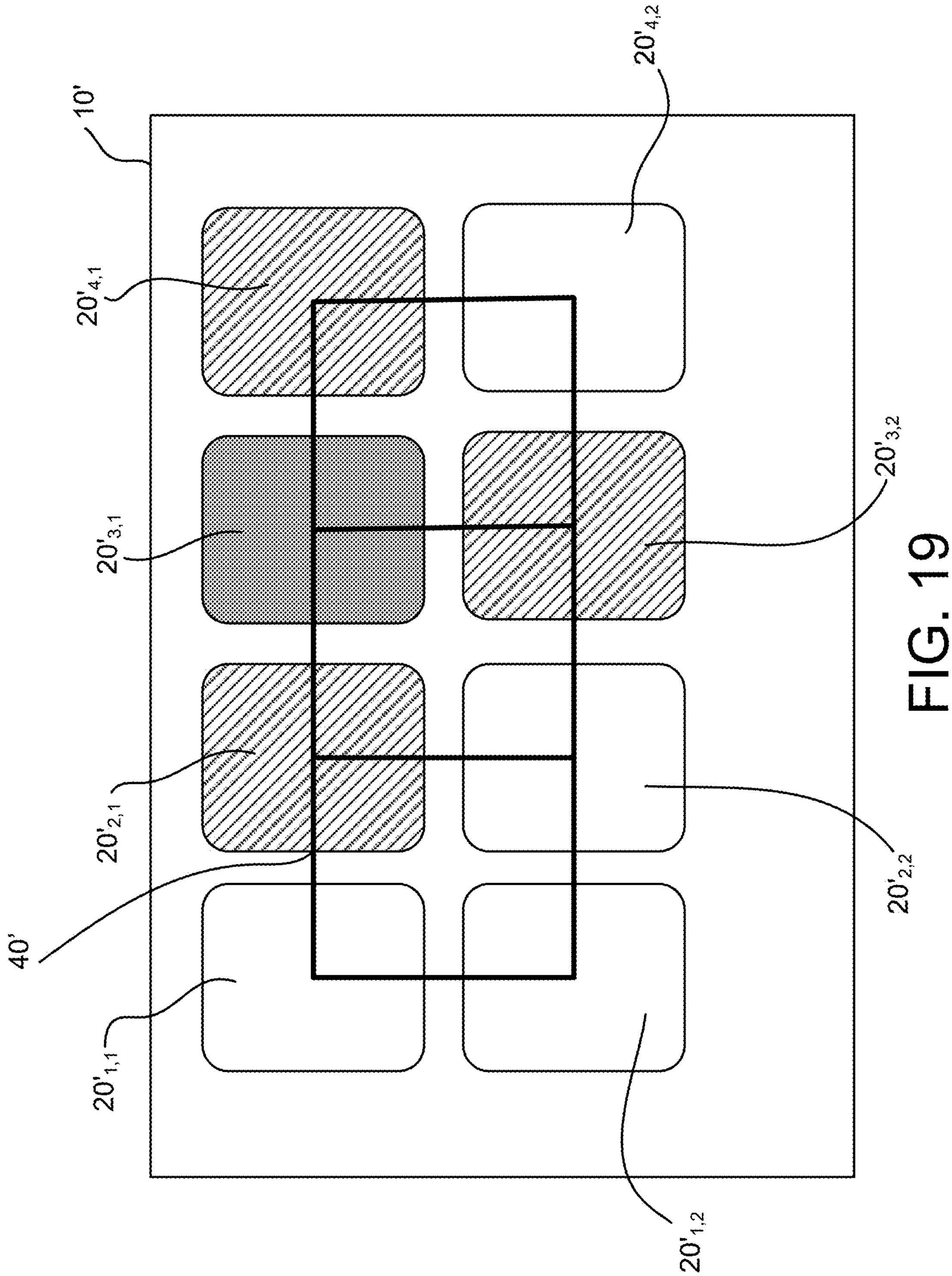
FIG. 19 is a schematic top view of the second flexible induction cooktop having a group of coils with one coil receiving power and other coils not receiving power according to a tenth example.

Similarly, an example of the second criterion on the second flexible induction cooktop 10', when setting the number of steps to 1, is shown in FIG. 19, where the first coil to be selected is coil $20'_{3,1}$, which is highlighted in dark gray. The coils ($20'_{2,1}$, $20'_{3,2}$, $20'_{4,1}$) that can be reached by moving one step along the grid 40' from the first coil $20'_{3,1}$ selected are indicated using diagonal hatching.

Figure 20:
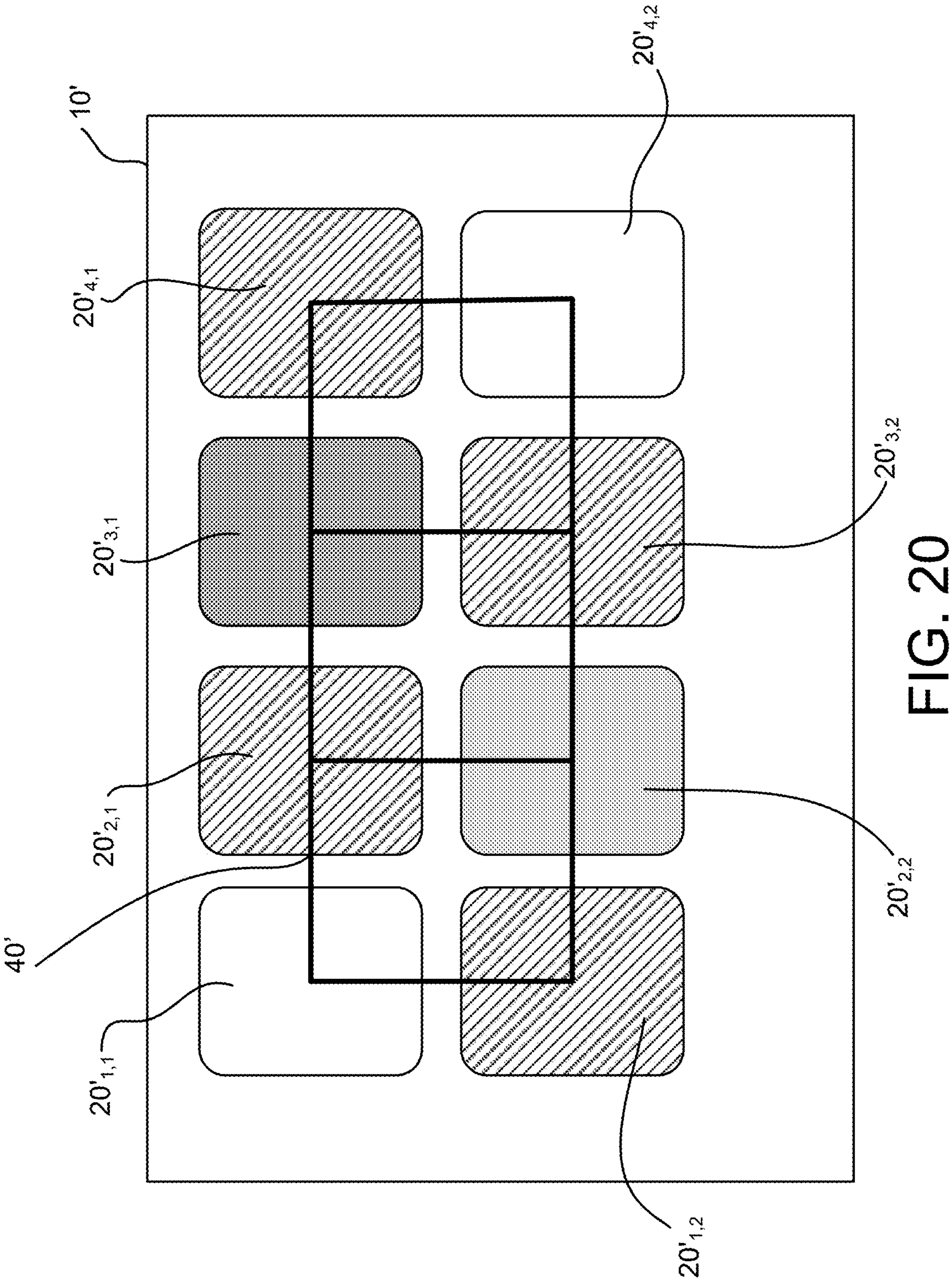
FIG. 20 is a schematic top view of the second flexible induction cooktop having two groups of coils with two coils receiving power and other coils not receiving power according to an eleventh example.

After adding a second coil $20'_{2,2}$, represented in FIG. 20 in light gray, additional coil ($20'_{1,2}$) is marked as preferably not activated, and are those that can be reached in one step along the grid starting from the second selected coil $20'_{2,2}$.

These kinds of selections are used in both the load curve acquisition and power delivery phases, so that the load curves used to control the power delivery do not undergo changes due to interaction between coils. This way, the system can control the power delivered by each coil much more accurately. In addition, the system needs to acquire, and maintain in memory, a much more limited number of load curves, in this case one curve for each coil, thus limiting the requirements on memory and time needed for load curve acquisition.

Figure 21:
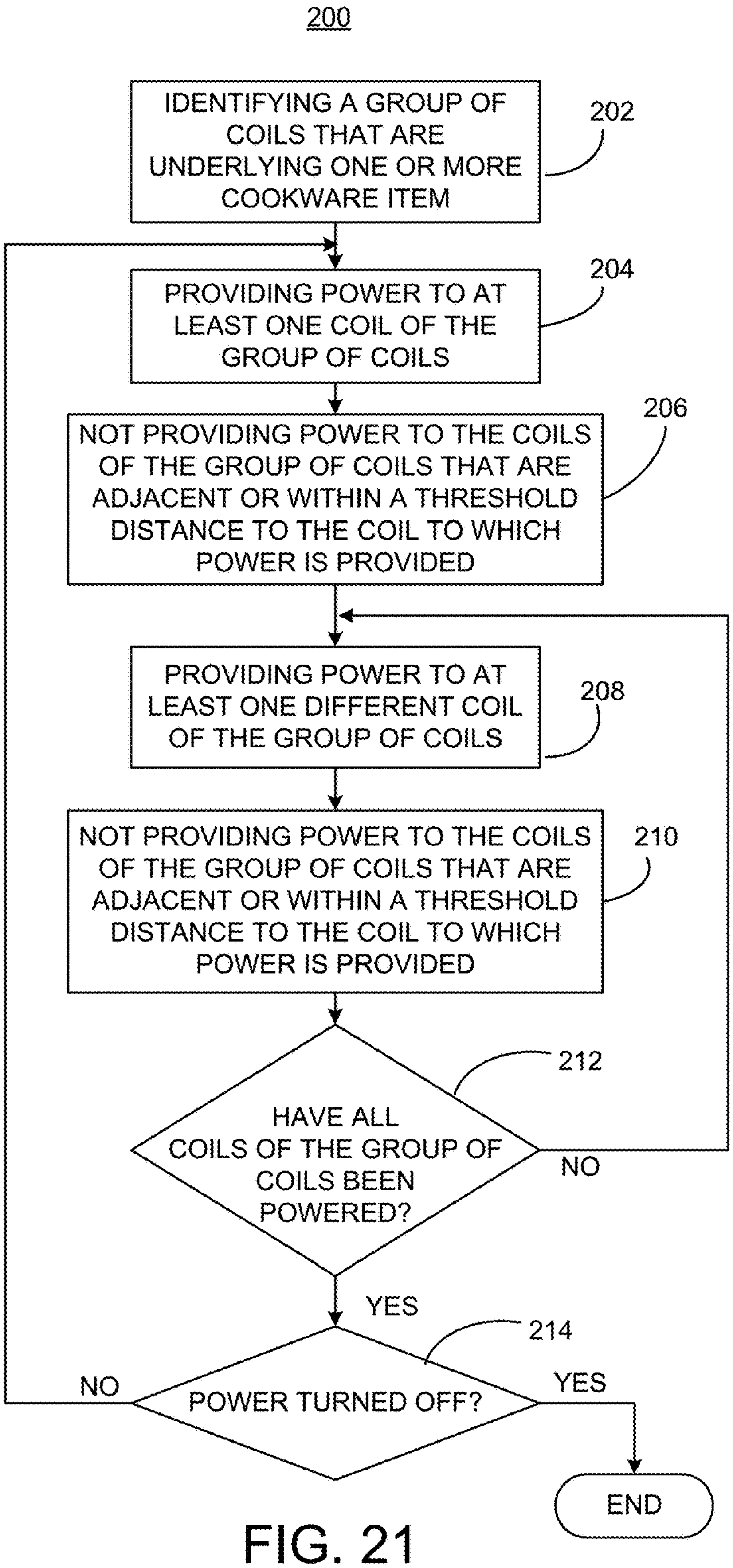
FIG. 21 is a flowchart generally illustrating the methods described herein.

In general, the above methods may be implemented by the controller 100 executing a routine having the steps of method 200, which is shown in FIG. 21. The method 200 begins by identifying a group of the plurality of coils that are underlying one or more cookware items (step 202); providing power to at least one coil of the group of coils underlying one or more cookware items (step 204); and not providing power to coils of the group of coils underlying the cookware items that are adjacent or within a threshold distance to the at least one coil to which power is provided to prevent interaction between adjacent coils of the group of coils (step 206). Next, after a predetermined time period, power is interrupted to the at least one coil that is powered, and power is instead provided to at least one different coil of the group of coils (step 208) while also not providing power to coils of the group of coils underlying the cookware item that are adjacent or within a threshold distance to the at least one different coil to which power is provided to prevent interaction between adjacent coils of the group of coils (step 210). Then, after a predetermined time period, power is interrupted to the at least one different coil that is powered and it is determined whether all of the coils in the group of coils have been powered (step 212). If not, steps 208 and 210 are repeated with at least one still different coil being powered. Once all of the coils in the group have been powered, it is determined whether a user has shut off the power to the cooktop (step 214). If power has been turned off, the method ends. Otherwise, the method is repeated starting with step 204 and is continued to be repeated through cycles of powering each coil of the group of coils until such time that the user shuts off the power to the cooktop.

According to a first aspect of the present disclosure, a method is provided for controlling average power delivered to coils of a flexible induction cooktop having a plurality of coils whose dimensions are typically smaller than the size of a cookware item and that are arranged adjacent to one another in a non-overlapping manner to form an array. The method comprises: a) identifying a group of the plurality of coils that are underlying one or more cookware items; b) providing power to at least one coil of the group of coils underlying one or more cookware items; and c) at the same time, not providing power to coils of the group of coils underlying the cookware items that are adjacent to the at least one coil to which power is provided to prevent interaction between adjacent coils of the group of coils.

In the method of the first aspect, coils are determined to be adjacent based on a distance between centers of each pair of coils and comparing the distance to a predetermined threshold.

The method of the first aspect, wherein the distance between each pair of coils is measured along a grid connecting the centers of adjacent coils, and wherein the predetermined threshold is a predefined amount of steps along the grid.

The method of the first aspect, wherein the coils have a rectangular shape with longer sides and shorter sides, and coils may be adjacent one another along either the longer side or the shorter side.

The method of the first aspect, wherein coils that are adjacent to each other on a longer side are not powered at the same time.

The method of the first aspect, wherein coils that are adjacent to each other either on a longer side or on a shorter side are not powered at the same time.

The method of the first aspect, wherein the coils have a circular shape.

The method of the first aspect, further comprising: d) after a predetermined time period, interrupting power to the at least one coil that is powered; and e) providing power instead to at least one different coil of the group of coils while also not providing power to coils of the group of coils underlying the cookware item that are adjacent to the at least one different coil to which power is provided to prevent interaction between adjacent coils of the group of coils.

The method of the first aspect, further comprising: f) after a predetermined time period, power is interrupted to the at least one different coil that is powered; g) determining whether all of the coils in the group of coils have been powered; and h) when not all of the coils in the group of coils have been powered, repeating steps d) and e) until all of the coils in the group of coils have been powered.

The method of the first aspect, further comprising: i) determining whether a user has shut off the power to the cooktop; and j) repeating steps b) through h) until the user has shut off the power to the cooktop.

A flexible induction cooktop comprising a controller for executing the method of the first aspect.

According to a second aspect of the present disclosure, a method is provided for controlling average power delivered to coils of a flexible induction cooktop having a plurality of coils whose dimensions are typically smaller than the size of a cookware item and that are arranged adjacent to one another in a non-overlapping manner to form an array. The method comprises: a) identifying a group of the plurality of coils that are underlying one or more cookware items; b) providing power to at least one coil of the group of coils underlying one or more cookware items; and c) restricting the coils that can be activated at the same time to be coils whose distance between each pair of the group of coils is larger than a predetermined threshold.

The method of the second aspect, wherein the distance between each pair of coils is measured between the centers of said coils.

The method of the second aspect, wherein the distance between each pair of coils is measured along a grid connecting the centers of adjacent coils, and wherein the predetermined threshold is a predefined amount of steps along the grid.

The method of the second aspect, wherein the coils have a rectangular shape with longer sides and shorter sides, and coils may be adjacent one another along either the longer side or the shorter side.

The method of the second aspect, wherein coils that are adjacent to each other on a longer side are not powered at the same time.

The method of the second aspect, wherein coils that are adjacent to each other either on a longer side or on a shorter side are not powered at the same time.

The method of the second aspect, wherein the coils have a circular shape.

The method of the second aspect, further comprising: d) after a predetermined time period, interrupting power to the at least one coil that is powered; e) providing power instead to at least one different coil of the group of coils while also not providing power to coils of the group of coils underlying the cookware item whose distance between each pair of the group of coils is larger than a predetermined threshold; f) after a predetermined time period, power is interrupted to the at least one different coil that is powered; g) determining whether all of the coils in the group of coils have been powered; h) when not all of the coils in the group of coils have been powered, repeating steps d) and e) until all of the coils in the group of coils have been powered; i) determining whether a user has shut off the power to the cooktop; and j) repeating steps b) through h) until the user has shut of the power to the cooktop.

A flexible induction cooktop comprising a control system for executing the method of the second aspect.

According to a third aspect of the present disclosure, a method is provided for controlling average power delivered to coils of a flexible induction cooktop having a plurality of coils whose dimensions are typically smaller than the size of a cookware item and that are arranged adjacent to one another in a non-overlapping manner to form an array. The method comprises: a) identifying a group of the plurality of coils that are underlying one or more cookware items, wherein the coils have a rectangular shape with longer sides and shorter sides, and coils may be adjacent one another along either the longer side or the shorter side; b) providing power to at least one coil of the group of coils underlying one or more cookware items; and c) not providing power to coils that are adjacent to each other on a longer side.

The method of the third aspect, further comprising: d) after a predetermined time period, interrupting power to the at least one coil that is powered; e) providing power instead to at least one different coil of the group of coils while also not providing power to coils of the group of coils underlying the cookware items that are adjacent to each other on a longer side; f) after a predetermined time period, power is interrupted to the at least one different coil that is powered; g) determining whether all of the coils in the group of coils have been powered; h) when not all of the coils in the group of coils have been powered, repeating steps d) and e) until all of the coils in the group of coils have been powered; i) determining whether a user has shut off the power to the cooktop; and j) repeating steps b) through h) until the user has shut of the power to the cooktop.

According to a fourth aspect of the present disclosure, a method is provided for controlling average power delivered to coils of a flexible induction cooktop having a plurality of coils whose dimensions are typically smaller than the size of a cookware item and that are arranged adjacent to one another in a non-overlapping manner to form an array. The method comprises: a) identifying a group of the plurality of coils that are underlying one or more cookware items, wherein the coils have a rectangular shape with longer sides and shorter sides, and coils may be adjacent one another along either the longer side or the shorter side; b) providing power to at least one coil of the group of coils underlying one or more cookware items; and c) not providing power to coils that are adjacent to each other either on a longer side or on a shorter side.

The method of the fourth aspect, further comprising: d) after a predetermined time period, interrupting power to the at least one coil that is powered; e) providing power instead to at least one different coil of the group of coils while also not providing power to coils of the group of coils underlying the cookware items that are adjacent to each other either on a longer side or on a shorter side; f) after a predetermined time period, power is interrupted to the at least one different coil that is powered; g) determining whether all of the coils in the group of coils have been powered; h) when not all of the coils in the group of coils have been powered, repeating steps d) and e) until all of the coils in the group of coils have been powered; i) determining whether a user has shut off the power to the cooktop; and j) repeating steps b) through h) until the user has shut of the power to the cooktop.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for controlling average power delivered to coils of a flexible induction cooktop, wherein the coils are smaller than the size of a cookware item and are arranged adjacent to one another in a non-overlapping manner to form a plurality of columns, wherein each of the columns in the plurality of columns comprises a plurality of coils, the method comprising:

a) identifying a group of the coils that are underlying one or more cookware items;

b) providing power to at least one coil of the group of coils underlying one or more cookware items; and c) at the same time, preventing interaction between adjacent coils of the group of coils by not providing power to coils of the group of coils underlying the cookware items that are adjacent to the at least one coil to which power is provided to.

2. The method of claim 1, wherein coils are determined to be adjacent based on a distance between centers of each pair of coils and comparing the distance to a predetermined threshold.

3. The method of claim 2, wherein the distance between each pair of coils is measured along a grid connecting the centers of adjacent coils, and wherein the predetermined threshold is a predefined amount of steps along intersecting points on the grid.

4. The method of claim 1, wherein the coils have a rectangular shape with longer sides and shorter sides, and coils may be adjacent one another along either the longer side or the shorter side.

5. The method of claim 4, wherein coils that are adjacent to each other on either a longer side or a shorter side are not powered at the same time.

6. The method of claim 1, wherein the coils have a circular shape.

7. The method of claim 1, further comprising:

d) after a predetermined time period, interrupting power to the at least one coil that is powered; and e) preventing interaction between adjacent coils of the group of coils, wherein the power is instead provided to at least one different coil of the group of coils while also not providing power to coils of the group of coils underlying the cookware items that are adjacent to the at least one different coil to which power is provided to.

8. The method of claim 7, further comprising:

f) after a predetermined time period, power is interrupted to the at least one different coil that is powered;

g) determining whether all of the coils in the group of coils has been powered; and h) repeating steps d) and e) until all of the coils in the group of coils have been powered.

9. The method of claim 8, further comprising:

i) determining whether a user has shut off the power to the cooktop; and j) repeating steps b) through h) until the user has shut off the power to the cooktop.

10. A flexible induction cooktop comprising a controller for executing the method of claim 1.

11. A method for controlling average power delivered to coils of a flexible induction cooktop that are arranged adjacent to one another in a non-overlapping manner to form a plurality of columns, wherein each of the columns in the plurality of columns comprises a plurality of coils, the method comprising:

a) identifying a group of the of coils that are underlying one or more cookware items;

b) providing power to at least one coil of the group of coils underlying one or more cookware items; and c) restricting the coils that can be activated at the same time to be coils whose distance between each pair of the group of coils is larger than a predetermined threshold.

12. The method of claim 11, wherein the distance between each pair of coils is measured between the centers of said coils.

13. The method of claim 11, wherein the distance between each pair of coils is measured along a grid connecting the centers of adjacent coils, and wherein the predetermined threshold is a predefined amount of steps along intersecting points on the grid.

14. The method of claim 11, wherein the coils have a rectangular shape with longer sides and shorter sides, and coils may be adjacent one another along either the longer side or the shorter side.

15. The method of claim 14, wherein coils that are adjacent to each other on either a longer side or a shorter side are not powered at the same time.

16. The method of claim 11, wherein the coils have a circular shape.

17. The method of claim 11, further comprising:

d) after a predetermined time period, interrupting power to the at least one coil that is powered;

e) providing power instead to at least one different coil of the group of coils while also not providing power to coils of the group of coils underlying the cookware items whose distance between each pair of the group of coils is larger than a predetermined threshold;

f) after a predetermined time period, power is interrupted to the at least one different coil that is powered;

g) determining whether all of the coils in the group of coils have been powered;

h) repeating steps d) and e) until all of the coils in the group of coils have been powered;

i) determining whether a user has shut off the power to the cooktop; and j) repeating steps b) through h) until the user has shut off the power to the cooktop.

18. A flexible induction cooktop comprising a control system for executing the method of claim 11.

19. A method for controlling average power delivered to coils of a flexible induction cooktop that are arranged adjacent to one another in a non-overlapping manner to form a plurality of columns, wherein each of the columns in the plurality of columns comprises a plurality of coils, the method comprising:

a) identifying a group of the coils that are underlying one or more cookware items, wherein the coils have a rectangular shape with longer sides and shorter sides, and coils may be adjacent one another along either the longer side or the shorter side;

b) providing power to at least one coil of the group of coils underlying one or more cookware items; and c) preventing interaction between adjacent coils of the group of coils wherein the power is not provided to coils that are adjacent to each other on a longer side.

20. The method of claim 19, further comprising:

d) after a predetermined time period, interrupting power to the at least one coil that is powered;

e) providing power instead to at least one different coil of the group of coils while also not providing power to coils of the group of coils underlying the cookware item that are adjacent to each other on a longer side;

f) after a predetermined time period, power is interrupted to the at least one different coil that is powered;

g) determining whether all of the coils in the group of coils have been powered;

h) repeating steps d) and e) until all of the coils in the group of coils have been powered;

i) determining whether a user has shut off the power to the cooktop; and j) repeating steps b) through h) until the user has shut off the power to the cooktop.

21. The method of claim 19, further comprising:

d) after a predetermined time period, interrupting power to the at least one coil that is powered;

e) providing power instead to at least one different coil of the group of coils while also not providing power to coils of the group of coils underlying the cookware item that are adjacent to each other either on a longer side or on a shorter side;

f) after a predetermined time period, power is interrupted to the at least one different coil that is powered;

g) determining whether all of the coils in the group of coils have been powered;

h) repeating steps d) and e) until all of the coils in the group of coils have been powered;

i) determining whether a user has shut off the power to the cooktop; and j) repeating steps b) through h) until the user has shut off the power to the cooktop.

22. A method for controlling average power delivered to coils of a flexible induction cooktop that are arranged adjacent to one another in a non-overlapping manner to form a plurality of columns, wherein each of the columns in the plurality of columns comprises a plurality of coils, the method comprising:

a) identifying a group of the coils that are underlying one or more cookware items, wherein the coils have a rectangular shape with longer sides and shorter sides, and coils may be adjacent one another along either the longer side or the shorter side;

b) providing power to at least one coil of the group of coils underlying one or more cookware items; and c) preventing interaction between adjacent coils of the group of coils wherein the power is not provided to coils that are adjacent to each other either on a longer side or on a shorter side.

* * * * *